US009563195B2

(12) United States Patent
Moriya

(10) Patent No.: US 9,563,195 B2
(45) Date of Patent: Feb. 7, 2017

(54) DEVICE AND METHOD FOR DISPLAYING A CHANGE IN THE POSITION OF AN OBJECT

(75) Inventor: Toshihiro Moriya, Nara (JP)

(73) Assignee: OMRON CORPORATION, Kyoto-shi (JP)

( * ) Notice: Subject to any disclaimer, the term of this patent is extended or adjusted under 35 U.S.C. 154(b) by 385 days.

(21) Appl. No.: 13/579,625

(22) PCT Filed: Jan. 27, 2011

(86) PCT No.: PCT/JP2011/051611
§ 371 (c)(1),
(2), (4) Date: Nov. 16, 2012

(87) PCT Pub. No.: WO2011/114776
PCT Pub. Date: Sep. 22, 2011

(65) Prior Publication Data
US 2013/0050276 A1 Feb. 28, 2013

(30) Foreign Application Priority Data
Mar. 15, 2010 (JP) .................................. 2010-057474

(51) Int. Cl.
G05B 19/4069 (2006.01)
G05B 19/18 (2006.01)
(52) U.S. Cl.
CPC . *G05B 19/4069* (2013.01); *G05B 2219/35353* (2013.01); *G05B 2219/42307* (2013.01)
(58) Field of Classification Search
CPC ............ G05B 2219/00; G05B 19/4069; G05B 2219/45104
(Continued)

(56) References Cited

U.S. PATENT DOCUMENTS 5,144,212 A * 9/1992 Izawa et al. ................... 318/569
5,537,016 A * 7/1996 Barg ..................... G05B 19/401
318/569
(Continued)

FOREIGN PATENT DOCUMENTS

DE 3438007 A1 4/1986
JP 62-037706 A 2/1987
(Continued)

OTHER PUBLICATIONS

Japanese Office Action for Application No. 2010-057474 issued Apr. 16, 2013 (2 Pages).
(Continued)

*Primary Examiner* — Jacinta M Crawford
*Assistant Examiner* — Shivang Patel
(74) *Attorney, Agent, or Firm* — Nutter McClennen & Fish LLP; John J. Penny, Jr.; Santiago Velez

(57) ABSTRACT

A display device that displays an error between an instructed command position of a specific portion of a control target and a response position of the specific portion in a manner easily understandable to a user is described. The display device acquires a response position of the specific portion and calculates a difference in position of the command position and the response position. The display device displays a spatial trajectory based on the command position or a spatial trajectory based on the response position. The display device also displays each spatial trajectory in a mode where a portion of the spatial trajectory of the command position corresponding to the selected mark and a portion of the spatial trajectory of the response position corresponding to the relevant portion of the spatial trajectory of the command position are enlarged at a same magnification.

11 Claims, 24 Drawing Sheets

(58) Field of Classification Search
USPC .......................................................... 345/672
See application file for complete search history.

(56) References Cited

U.S. PATENT DOCUMENTS

| | | |
|---|---|---|
| 6,167,328 A | 12/2000 | Takaoka et al. |
| 7,355,145 B2 | 4/2008 | Ikeda et al. |
| 2006/0186849 A1* | 8/2006 | Iwashita et al. .............. 318/576 |

FOREIGN PATENT DOCUMENTS

| | | |
|---|---|---|
| JP | 03-021814 A | 1/1991 |
| JP | 03-287343 A | 12/1991 |
| JP | 06-138934 A | 5/1994 |
| JP | 07-261818 A | 10/1995 |
| JP | 10-034252 A | 2/1998 |
| JP | 11-143514 A | 5/1999 |
| JP | 2000-132214 A | 5/2000 |
| JP | 2001-125613 A | 5/2001 |
| JP | 2003-022454 A | 1/2003 |
| JP | 2006-026640 A | 2/2006 |
| JP | 2007-242054 A | 9/2007 |

OTHER PUBLICATIONS

International Search Report mailed Apr. 19, 2011 for Application No. PCT/JP2011/051611 (4 Pages).
Extended European Search Report for Application No. 11755966.6 issued Feb. 17, 2014 (7 Pages).

* cited by examiner

Fig. 6

| Motor type | Rated output | Moment of inertia ×10⁻⁴ kg·m² | Viscosity friction coefficient Pa·s | Dynamic friction coefficient | ...... |
|---|---|---|---|---|---|
| XXXX-001 | 100 | 0.045 | 1.8×10^-6 | 0.10 | ...... |
| XXXX-002 | 150 | 0.061 | 1.8×10^-6 | 0.10 | . |
| XXXX-003 | 80 | 0.041 | 1.8×10^-6 | 0.15 | ...... |
| ...... | ...... | ...... | ...... | ...... | ...... |

| | Command position, PC calculation (command A) | Command value PLC calculation (for control) | Command value PLC → PC (transfer) (command B) | Predicted position PC calculation | Actually measured value PLC → PC (transfer) | Display main body (display data) |
|---|---|---|---|---|---|---|
| 1 | Calculate, display | — | — | Calculate, display | — | PC (Command A, predicted position) |
| 2 | Calculate, display | Calculation for control | — | — | Transfer, display | PC (Command A, actually measured value) |
| 3 | — | Calculation for control | Transfer, display | — | Transfer, display | PC (Command B, actually measured value) |
| 4 | Calculate, display | Calculation for control | — | Calculate, display | Transfer, display | PC (Command A, predicted position, actually measured value) |
| 5 | Calculation for prediction | Calculation for control | Transfer, display | Calculate, display | Transfer, display | PC (Command B, predicted position, actually measured value) |

DEVICE AND METHOD FOR DISPLAYING A CHANGE IN THE POSITION OF AN OBJECT

TECHNICAL FIELD

The present invention relates to a display device for displaying a change in position of a specific portion of a control target driven based on a series of command values output by execution of a motion control program as a trajectory on a screen.

BACKGROUND ART

A motion program for driving a control target is conventionally known.

Japanese Unexamined Patent Publication No. 2007-242054 (patent document 1) discloses a robot language processing device as a device for processing an operation program, which is the motion program. The robot language processing device stores the operation program in which target position data of an industrial robot is described by a movement order. The robot language processing device three-dimensionally displays graphically a trajectory of a distal end of a robot arm that moves according to the operation program.

Japanese Unexamined Patent Publication No. 6-138934 (patent document 2) discloses a tool path displaying method of a numerical value control device. The numerical value control device displays a path of a tool driven by a servo motor of an X axis and a servo motor of a Y axis on an XY plane. The path of the tool displayed by the numerical value control device includes two types. One is an ideal path that complies with the program. The other is the actual path of the tool, which has an error from the ideal path. The numerical value control device displays a programmed motion component in one time for the actual path of the tool, and displays in an enlarged manner an error component at a large magnification of, for example, twenty thousand times. The numerical value control device displays the actual path of the tool overlapping the display of the ideal path, or replacing the display of the ideal path for an erroneous portion.

Patent Document 1: Japanese Unexamined Patent Publication No. 2007-242054

Patent Document 2: Japanese Unexamined Patent Publication No. 6-138934

DISCLOSURE OF THE INVENTION

Problems to be Solved by the Invention

The motion program is a program for outputting a series of command values to be provided to a control target related to a motion of the control target. The motion program is typically executed in a controller such as a PLC (Programmable Logic Controller). The controller provides a series of command values indicating a position of a specific portion of the control target to a motor driver for driving a motor of the control target. The position of the specific portion of the control target is, for example, a rotation position of the motor and/or a distal end position of an arm of the control target. An error dynamically occurs between the position of the specific portion of the control target and the position instructed by the command value as the control target has mass and friction.

When the user creates or corrects the motion program, the user can easily adjust the program such that the error is reduced at a portion requiring an accurate control if the occurrence status of the error of the position can be grasped. Furthermore, the user can easily adjust the program such that the motion becomes faster at the portion where an allowable error is large.

Patent document 2 discloses one method of displaying the error of the position. In this method, the trajectory of an actually measured position in which only the error component is enlarged at a large magnification is displayed in an overlapping manner with respect to the trajectory of the command position. Thus, if the corresponding command position and the actually measured position are distant on the display screen, the correspondence relationship of the command position and the actually measured position becomes difficult to recognize. Thus, it becomes difficult for the user to accurately grasp the occurrence status of the error.

The present invention provides a display device, a display control method, a display program, and a computer readable recording medium capable of displaying an error between a commanded position (command position) of a specific portion of a control target corresponding to the command value and a position (predicted position) theoretically predicted for the specific portion of the actual control target or a position (actually measured position) measured for the relevant specific portion when the motion program is executed in a manner easily recognizable by the user.

Means for Solving the Problem

According to one aspect of the present invention, a display device is a display device for displaying a change in position of a specific portion of a control target, the control target being driven based on a series of command values output by execution of a motion program, on a screen as a trajectory. The display device includes a first position acquiring unit configured to acquire a series of command positions, which are positions of the specific portion, based on the series of command values when mass and friction of the control target are ignored; a second position acquiring unit configured to acquire a series of response positions corresponding to the series of command positions, the series of response positions being at least one of a series of positions of the specific portion based on the series of command values when a simulation taking into consideration at least one of the mass and the friction of the control target is performed and a series of positions of the specific portion measured when the control target has been driven based on the series of command values; an error calculating section configured to calculate a difference in position of the command position and the response position corresponding to the command position; a determination section configured to determine whether or not the calculated difference is greater than or equal to a predefined threshold value; a first display data creating section configured to create data for displaying on the screen at least one of a spatial trajectory formed by the series of command positions and a spatial trajectory formed by the series of response positions, and a first mark indicating a portion of the spatial trajectory in which the calculated difference is greater than or equal to the predefined threshold value; an accepting unit configured to accept a selecting operation of the first mark; a second display data creating section configured to create data for displaying each spatial trajectory on the screen in a mode where a portion of a spatial trajectory of the command position corresponding to the selected first mark and a portion of a spatial trajectory of the response position corresponding to the portion of the spatial trajectory of the command position are enlarged at a same magnification, the mode being such that the enlarged portions of the spatial trajectories are overlapping each other; and a display control unit configured to display on the screen data created by the first display data creating section and data created by the second display data creating section.

The second display data creating section preferably further creates data for displaying on the screen a second mark indicating the command position at a specified time and a third mark indicating the response position at the specified time. The display control unit displays the second mark and the third mark when displaying the data created by the second display data creating section on the screen.

The second display data creating section preferably creates the data so that a color of the enlarged spatial trajectory of the response position changes based on a magnitude of the calculated difference when creating data for displaying each spatial trajectory on the screen. The display control unit displays on the screen the enlarged spatial trajectory of the response position with the color based on the magnitude of the calculated difference when displaying data created by the second display data creating section on the screen.

The second display data creating section preferably creates the data so that a display magnification of the spatial trajectory becomes respectively a specified display magnification in a first direction and a second direction orthogonal to the first direction in the screen when creating data for displaying each spatial trajectory on the screen. The display control unit displays on the screen each spatial trajectory enlarged at the specified display magnification in each of the first direction and the second direction.

A third display data creating section configured to create data for displaying a two-dimensional graph having a first axis as time or a displacement of the specific portion, and a second axis as the command position, a velocity of the specific portion calculated based on the command position, the response position, or a velocity of the specific portion calculated based on the response position; and data for displaying the portion in which the calculated difference is greater than or equal to a predefined threshold value on the two-dimensional graph, and the data for displaying a fourth mark, which is a target of the selecting operation is further preferably arranged. The display control unit displays the two-dimensional graph and the fourth mark on the screen.

The display device preferably further includes a third display data creating section configured to create data for displaying a two-dimensional graph having a first axis as time or a displacement of the specific portion, and a second axis as the magnitude of the calculated difference; and data for displaying a portion in which the calculated difference is greater than or equal to a predefined threshold value on the two-dimensional graph, the data displaying a fourth mark, which is a target of the selecting operation. The display control unit displays the two-dimensional graph and the fourth mark on the screen.

The display device preferably further includes a third display data creating section configured to create data for displaying a two-dimensional graph having a first axis as time or a displacement of the specific portion, and a second axis as a distance from a spatial trajectory of the command position to a spatial trajectory of the response position taken along a direction perpendicular to a tangential direction of the spatial trajectory of the command position; and data for displaying a portion in which the calculated difference is greater than or equal to a predefined threshold value on the two-dimensional graph, the data displaying a fourth mark, which is a target of the selecting operation. The display control unit displays the two-dimensional graph and the fourth mark on the screen.

In accordance with another aspect of the present invention, a display control method is a method for displaying a change in position of a specific portion of a control target, the control target being driven based on a series of command values output by execution of a motion program on a screen of a display device as a trajectory. The display control method includes the steps of acquiring a series of command positions, which are positions of the specific portion, based on the series of command values when mass and friction of the control target are ignored by a processor (901) of the display device; acquiring a series of response positions corresponding to the series of command positions, the series of response positions being at least one of a series of positions of the specific portion based on the series of command values when a simulation taking into consideration at least one of mass and friction of the control target is performed by the processor and a series of positions of the specific portion measured when the control target device has been driven based on the series of command values; calculating a difference in position of the command position and the response position corresponding to the command position by the processor; determining whether or not the calculated difference is greater than or equal to a predefined threshold value by the processor; creating first data for displaying on the screen at least one of a spatial trajectory formed by the series of command positions and a spatial trajectory formed by the series of response positions, and a mark indicating a portion of the spatial trajectory in which the calculated difference is greater than or equal to the predefined threshold value by the processor; accepting selecting operation of the mark by the processor; creating second data for displaying each spatial trajectory on the screen in a mode where a portion of a spatial trajectory of the command position corresponding to the selected first mark and a portion of a spatial trajectory of the response position corresponding to the portion of the spatial trajectory of the command position are enlarged at a same magnification, the mode being such that the enlarged portions of the spatial trajectories are overlapping each other; and displaying the first data and the second data on the screen by the processor.

According to another further aspect of the present invention, a program is a program for displaying a change in position of a specific portion of a control target, the control target being driven based on a series of command values output by execution of a motion program on a screen of a display device as a trajectory. The program causes the display device to execute the steps of acquiring a series of command positions, which are positions of the specific portion, based on the series of command values when mass and friction of the control target are ignored; acquiring a series of response positions corresponding to the series of command positions, the series of positions being at least one of a series of positions of the specific portion based on the series of command values when a simulation taking into consideration at least one of mass or friction of the control target is performed and a series of positions of the specific portion measured when the control target has been driven based on the series of command values; calculating a difference in position of the command position and the response position corresponding to the command position; determining whether or not the calculated difference is greater than or equal to a threshold value defined in advance; creating first data for displaying on the screen at least one of a spatial trajectory formed by the series of command positions and a spatial trajectory formed by the series of response positions, and a mark indicating a portion of the spatial trajectory in which the calculated difference is greater than or equal to the threshold value; accepting selecting operation of the mark; creating second data for displaying each spatial trajectory on the screen in a mode where a portion of a spatial trajectory of the command position corresponding to the selected first mark and a portion of a spatial trajectory of the response position corresponding to the portion of the spatial trajectory of the command position are enlarged at a same magnification, the mode being such that the enlarged portions of the spatial trajectories are overlapping each other; and displaying the first data and the second data on the screen.

According to still another further aspect of the present invention, computer readable recording medium is a recording medium storing a program for displaying a change in position of a specific portion of a control target, the control target being driven based on a series of command values output by execution of a motion program on a screen of a display device as a trajectory. The program causes the display device to execute the steps of acquiring a series of command positions, which are positions of the specific portion, based on the series of command values when mass and friction of the control target are ignored; acquiring a series of response positions corresponding to the series of command positions, the series of positions being at least one of a series of positions of the specific portion based on the series of command values when a simulation taking into consideration at least one of mass or friction of the control target is performed and a series of positions of the specific portion measured when when the control target has been driven is performed based on the series of command values; calculating a difference in position of the command position and the response position corresponding to the command position; determining whether or not the calculated difference is greater than or equal to a threshold value defined in advance; creating first data for displaying on the screen at least one of a spatial trajectory formed by the series of command positions and a spatial trajectory formed by the series of response positions, and a mark indicating a portion of the spatial trajectory in which the calculated difference is greater than or equal to the threshold value; accepting selecting operation of the mark; creating second data for displaying each spatial trajectory on the screen in a mode where a portion of a spatial trajectory of the command position corresponding to the selected first mark and a portion of a spatial trajectory of the response position corresponding to the portion of the spatial trajectory of the command position are enlarged at a same magnification, the mode being such that the enlarged portions of the spatial trajectories are overlapping each other; and displaying the first data and the second data on the screen.

Effect of the Invention

The error between the commanded command position of a specific portion of a control target corresponding to the command value and the predicted position theoretically predicted for the specific portion of the actual control target or the actually measured position measured for the relevant specific portion can be displayed so as to be easily understood by the user.

BRIEF DESCRIPTION OF THE DRAWINGS

FIG. 6 is a view showing one example of a data structure of the motor Data Base (DB).

FIG. 24 is a view showing an example of a combination that may be adopted realistically for the main bodies and the like of the calculation process of the command position, the command value, the predicted position, and the actually measured value.

BEST MODE FOR CARRYING OUT THE INVENTION

Figure 1:
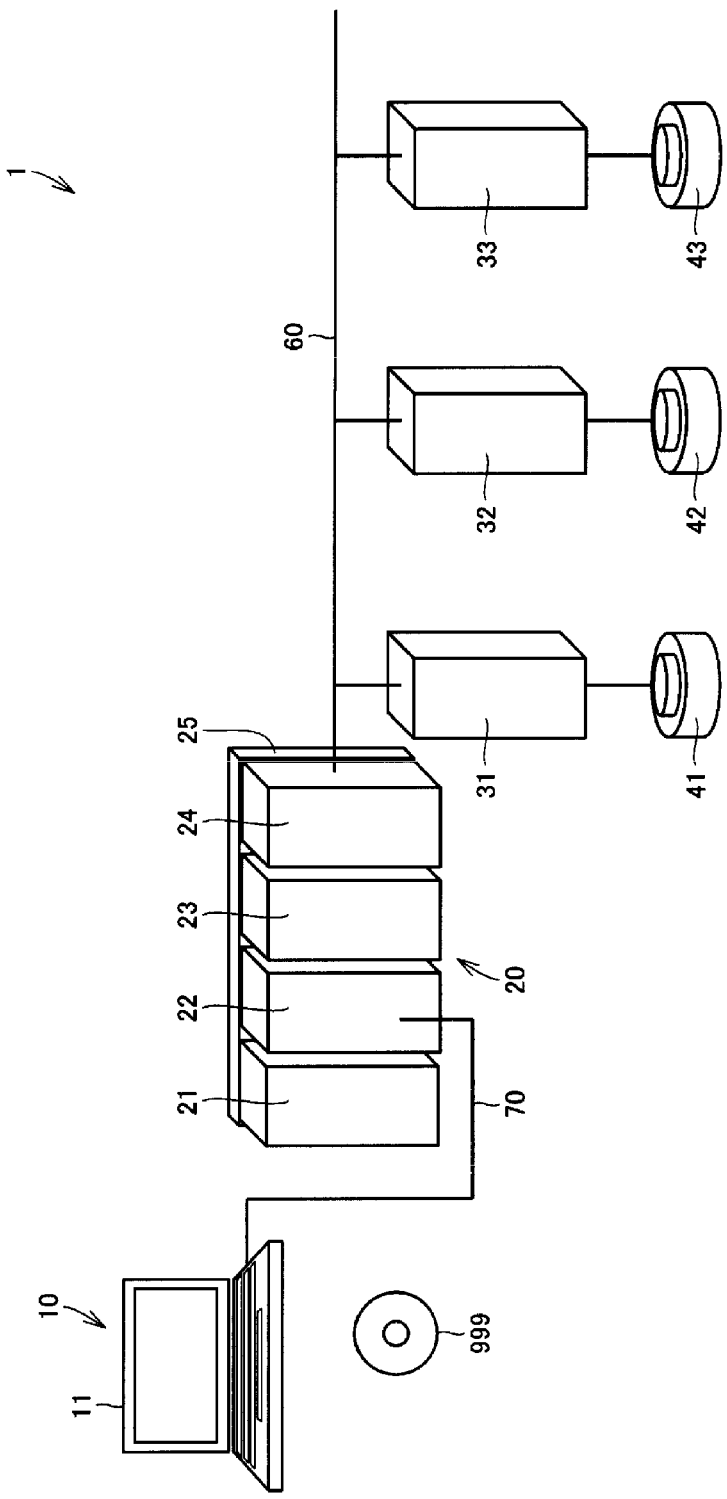
FIG. 1 is a view showing a schematic configuration of a control system according to the present embodiment.

A display device according to an embodiment of the present invention will be hereinafter described with reference to the drawings. In the following description, the same reference numerals denote the same components. The names and functions thereof do the same. Therefore, the detailed description of such components will not be repeated unnecessarily.

FIG. 1 is a view showing a schematic configuration of a control system 1 according to the present embodiment. With reference to FIG. 1, the control system 1 includes a PC (Personal Computer) 10, a PLC 20, servo amplifiers 31 to 33, and servo motors 41 to 43. A movable mechanism (see FIG. 9) driven by each of the servo motors 41 to 43 is connected to each of the servo motors 41 to 43. A device including each servo motor and each movable mechanism is hereinafter referred to as "control target".

The PLC 20 includes a power supply unit 21, a CPU (Central Processing Unit) 22, an I/O (Input/Output) unit 23, an MC (Motion Control) unit 24, and a backplane 25. The power supply unit 21, the CPU unit 22, the I/O unit 23, and the MC unit 24 are electrically connected to each other by way of the backplane 25.

The PLC 20 executes a motion program. The motion program in the present embodiment is a program including control of a motor. A sequence of the motion program is described in a form of a sequence program using a ladder diagram language, and the like. A motor control FB (Function Block), that is, a motion FB is used in the sequence program. In a more limited sense, the motion FB is sometimes referred to as the motion program.

The CPU 22 executes the sequence program.

The MC unit 24 receives an instruction on the type of the motion FB to execute and the parameters necessary for executing the motion FB from the CPU unit 22. The MC unit 24 executes the content of the motion FB. The MC unit 24 outputs a series of command values to the servo amplifiers 31 to 33 with the lapse of time. The MC unit 24 notifies the execution status and the execution result of the content of the motion FB to the CPU 22. The MC unit 24 independent from the CPU unit 22 may not be provided, and the CPU unit 22 may perform the function of the MC unit 24.

The I/O unit 23 acquires the input data from a switch, a sensor and the like, and provides the same to the CPU unit 22. The input data is used in the determination on whether the condition is met in the sequence program in the CPU 22.

The servo amplifiers 31 to 33 are motor drivers for driving the servo motors 41 to 43 in response to the command value from the MC unit 24. Not limited to the servo motors 41 to 43, the pulse motor, or the like may also be used in the control system 1. In this case, a motor driver corresponding to the type of motor adopted is used. The servo amplifiers 31 to 33 are connected to the MC unit 24 through a communication line 60 such as EtherCAT (registered trademark).

The command value provided from the MC unit 24 to the servo amplifiers 31 to 33 is the value of the position, velocity, torque, and the like of the motor. In the present embodiment, the command value of the position is assumed to be provided from the MC unit 24 to the servo amplifiers 31 to 33 at a constant period.

The command value of the position may be the rotation position (rotation angle) of the servo motors 41 to 43 or may be the position of a specific portion of the control target driven by the servo motors 41 to 43. In the following description, the position of the specific portion of the control target to be realized in correspondence with the command value of the position, in particular, to be the trajectory display target is referred to as "command position". The servo amplifiers 31 to 33 are set in advance with the setting to correctly interpret the command value (e.g., multiplying an appropriate coefficient to the command value, etc.) and drive the servo motors 41 to 43. The servo amplifiers 31 to 33 supply drive current to the servo motors 41 to 43. The servo amplifiers 31 to 33 receive the feedback of an actually measured value from an encoder for detecting the rotation position of the servo motor arranged in the servo motors 41 to 43. The servo amplifiers 31 to 33 control the drive current such that the actually measured value follows the command value using the actually measured value and an actually measured velocity calculated as amount of change of the actually measured value.

The command value of the position is sometimes expressed in a form of number of pulses sent within one control period through the communication line 60 directly connecting the MC unit 24 and the servo amplifiers 31 to 33. In this case, the number of pulses represent the relative position (amount of change in position) from the position in the control period immediately before.

For instance, the number of pulses corresponding to one rotation of the servo motors 41 to 43 is set in the servo amplifiers 31 to 33. The number of pulses corresponding to one rotation of the servo motors 41 to 43 is similarly set in the MC unit 24, and the displacement of the specific portion of the control target corresponding to one rotation of the servo motors 41 to 43 is also set. The MC unit 24 uses such set values to send the number of pulses necessary for realizing the motion of the control target programmed for every control period to the servo amplifiers 31 to 33.

The servo amplifiers 31 to 33 rotate the servo motors 41 to 43 in accordance with the received number of pulses. If the encoder for detecting the rotation positions of the servo motors 41 to 43 is an incremental type, the PLC 20 detects the actually measured value of the position in a form of number of pulses corresponding to the rotation angle of the servo motors 41 to 43. Thus, the PLC 20 can obtain the actually measured position of the control target from a series of number of pulses detected for every control period.

The PC 10 functions as a display device for displaying the trajectory on a screen 11. The PC 10 is connected to the CPU 22 by way of a communication line 70 such as the USB (Universal Serial Bus). As described later (FIG. 2), a support program of the PLC 20 is installed in the PC 10. The support program of the PLC 20 includes a display program for displaying the trajectory on the screen 11.

A CD-ROM (Compact Disk-Read Only Memory) 999 stores the support program of the PLC 20. The support program of the PLC is installed from the CD-ROM 999 to the PC 10.

Figure 2:
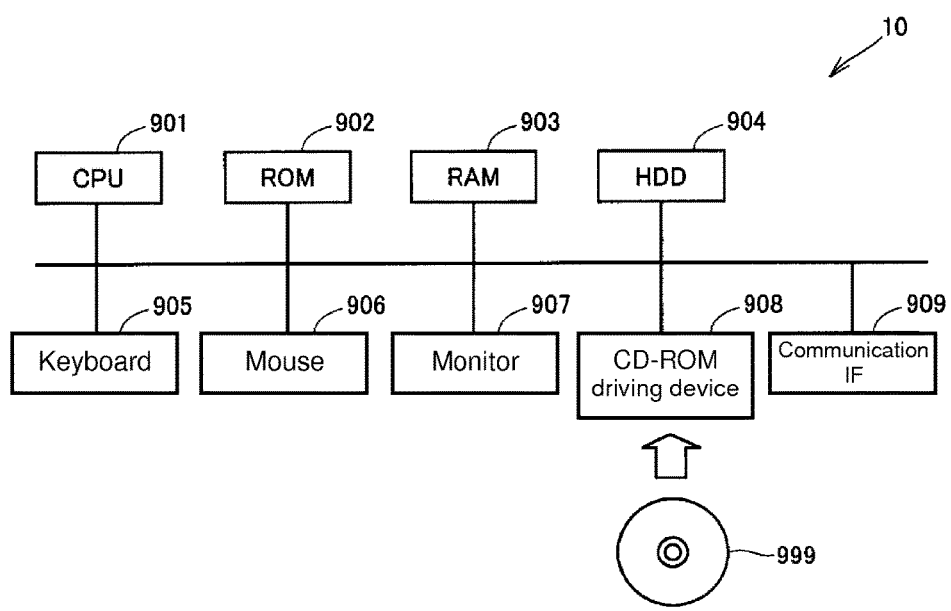
FIG. 2 is a block diagram showing a hardware configuration of a PC.

FIG. 2 is a block diagram showing a hardware configuration of the PC 10. With reference to FIG. 2, the PC 10 includes, as main configuring components, a CPU 901 for executing a program, a ROM (Read Only Memory) 902 for storing data in a nonvolatile manner, a RAM 903 for storing in a volatile manner data generated as a result of the execution of the program by the CPU 901 or data input through a keyboard 905 or a mouse 906, an HDD (Hard Disk Drive) 904 for storing data in a nonvolatile manner, the keyboard 905 and the mouse 906 for receiving input of instructions by the user of the PC 10, a monitor 907, a CD-ROM driving device 908, and a communication interface (IF) 909. Each configuring component is connected to each other by a data bus. The CD-ROM 999 is attached to the CD-ROM driving device 908.

The processes in the PC 10 are realized by software executed by each hardware and the CPU 901. Such software is sometimes stored in advance in the HDD 904. The software may also be stored in the CD-ROM 999 or other storage media, and distributed as a program product. Alternatively, the software may be provided as a program product that can be downloaded by an information provider connected to the so-called Internet. Such software is read from the storage medium by the CD-ROM driving device 908 or other reading devices, or downloaded through the communication IF 909, and once stored in the HDD 904. The software is then read out from the HDD 904 by the CPU 901 and stored in the RAM 903 in a form of an executable program. The CPU 901 executes the program.

Each configuring component configuring the PC 10 shown in the figure is a typical component. Therefore, the essential portion of the present invention is the software stored in the RAM 903, the HDD 904, the CD-ROM 999, or other storage medium, or the software that can be downloaded through the network. Since the operation of each hardware of the PC 10 is well known, the detailed description will not be repeated herein.

The recording medium is not limited to DVD-ROM, CD-ROM, FD (Flexible Disk), and hard disk, and may be a medium that fixedly carries the program such as a semiconductor memory including a magnetic tape, cassette tape, optical disc (MO (Magnetic Optical Disc)/MD (Mini Disc)/DVD (Digital Versatile Disc)), IC (integrated Circuit) card (include memory card), optical card, mask ROM, EPROM (Electronically Programmable Read-Only Memory), EEPROM (Electronically Erasable Programmable Read-Only Memory), flash ROM and the like. The recording medium is a non-temporary medium from which the computer can read the relevant program.

The program referred to herein includes not only the program directly executable by the CPU, but also a program in a form of source program, compression processed program, coded program, and the like.

Figure 3:
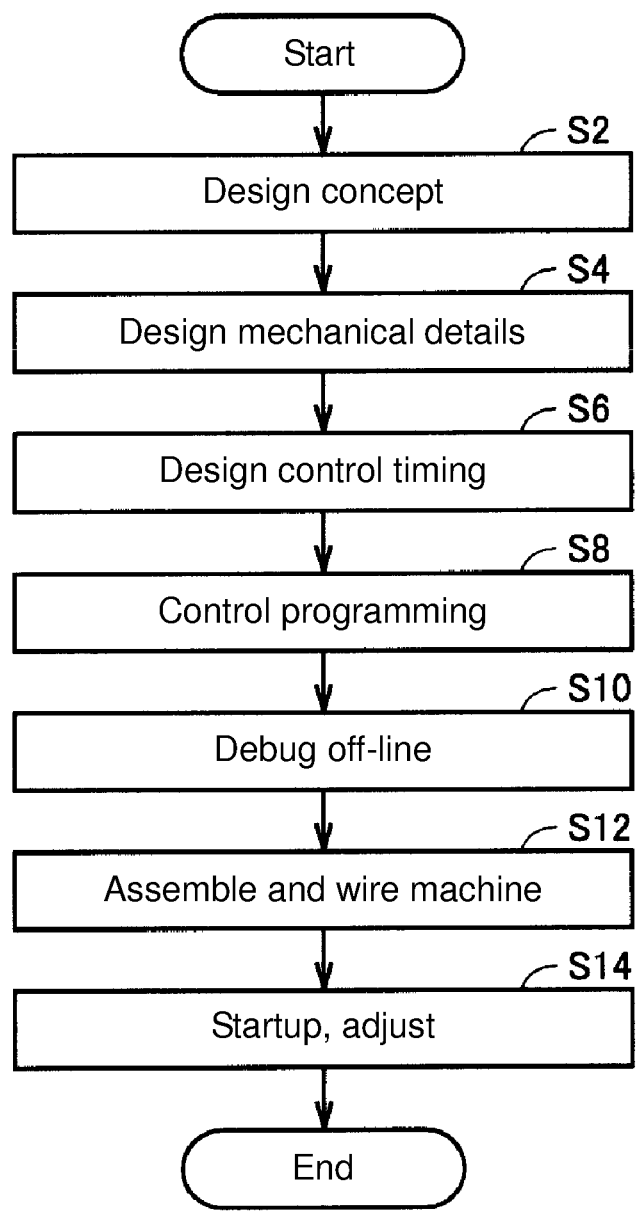
FIG. 3 is a view showing a general development procedure of a control system including a control target having a servo motor, and a PLC for controlling the operation of the control target.

FIG. 3 is a view showing a general development procedure of a control system including the control target having the servo motor, and the PLC for controlling the operation of the control target. A mechanical person in charge (mechanism person in charge) and a control person in charge share and cooperate to carry out each of the following steps.

With reference to FIG. 3, the mechanical person in charge designs a concept in step S2. Specifically, the mechanical person in charge determines specifications such as function, structure and performance of the entire control target in the relevant step. In step S4, the mechanical person in charge carries out a detailed design of the mechanism of the control target. The mechanical person in charge sometimes performs an operation interference check of a movable unit using a three-dimensional CAD in the relevant step.

In step S6, the mechanical person in charge and the control person in charge perform control timing designing. Specifically, the mechanical person in charge first creates a timing chart and a velocity diagram of each operation of the device in the relevant step. The mechanical person in charge transmits the created timing chart and the velocity diagram to the control person in charge. The control person in charge selects the type of PLC and the unit configuration based on the transmitted design information.

In step S8, the control person in charge carries out the control programming. Specifically, the control person in charge performs the following tasks (a) to (e) in the relevant step.

(a) The control person in charge creates a memory map (definition of control input and control output in PLC).

(b) The control person in charge determines the network and the data link between the PLC and the servo amplifier, and among the PLCs when using a plurality of PLCs.

(c) The control person in charge determines the parameter of the MC unit and the servo amplifier.

(d) The control person in charge creates a sequence program using the ladder diagram language, and the like.

(e) The control person in charge determines the parameters such as position and velocity for the motion FB used in the sequence program.

In step S10, the control person in charge performs debugging of the program in an offline state. Specifically, the control person in charge performs the following debugging of the content (f) to (j) at the desk using the PC 10 in the relevant step.

(f) The control person in charge corrects a compile error if there is any.

(g) The control person in charge references the trajectory of the command position and corrects the error of the parameter of the motion FB if there is any.

(h) The control person in charge confirms a spatial trajectory of a two-dimensional or three-dimensional command position simulated at various conditions such as ON/OFF state of a contact, and whether an intended command is executed in the various conditions, and corrects the error if there is any in the sequence program.

(i) The control person in charge corrects the program if an error between the command position and a predicted position obtained by simulation exceeds a tolerable range by reducing the velocity of the relevant portion or adjusting the target position anticipating the error.

(j) The control person in charge corrects the program if the takt time required for the operation to go around once exceeds a design time by shortening the operation path, increasing the speed of the portion where the position error is tolerated, and shortening the acceleration and deceleration time.

In step S12, the mechanical person in charge and the control person in charge cooperate to assemble and wire the machine. Furthermore, the control person in charge transfers the motion program completed with the desk debugging from the PC 10 to the PLC 20.

In step S14, the control person in charge makes a test run and carries out the adjustment of the control target. Specifically, the control person in charge carries out the following tasks (k) to (o) in the relevant step.

(k) The control person in charge performs a JOG run for every shaft, and confirms that there are no problems in the doneness of the device. The "shaft" referred here is originated from the word "rotation shaft" of the motor, and means one motor, or one motor and a movable portion driven by such motor. The JOG run means continuously moving the shaft at a specified constant speed.

(l) The control person in charge performs a test run of the program control, and confirms whether the device is performing the assumed operation.

(m) The control person in charge performs a continuous operation test.

(n) The control person in charge performs the online debugging. In other words, the control person in charge collects data corresponding to a series of actually measured positions of a specific portion of the device by a data trace function of the PLC and transfers the data to the PC, where the trajectory of the actually measured position is displayed in comparison with the trajectory of the command position in the PC to confirm whether the error is within a tolerable range.

(o) The control person in charge measures the takt time, and corrects the program if the measured takt time exceeds a design time so as to be within the design time, similar to the case of the offline debugging.

In step S10 and step S14, the trajectories of the positions are displayed in comparison on the screen 11 of the PC 10 to show the error between the command position and the predicted position or the actually measured position. To this end, the PC 10 serving as the display device is used.

Figure 4:
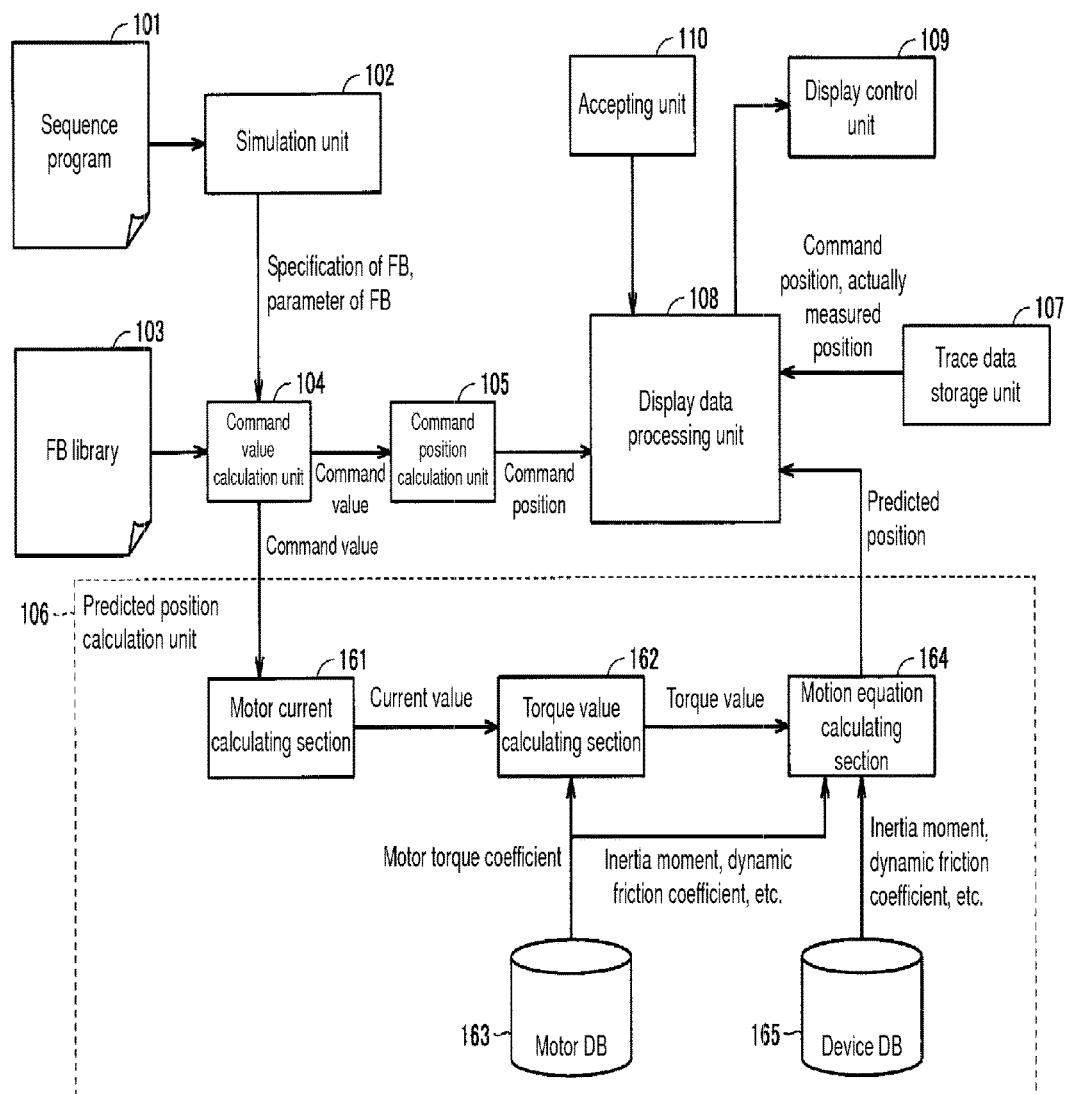
FIG. 4 is a function block diagram of a display program of a motion trajectory included in a support program executed by the PC 10.

FIG. 4 is a function block diagram of a display program of the motion trajectory included in the support program executed by the PC 10. In addition to the display program, the support program includes the editor and the debugger of the sequence program 101, the communication program with the PLC 20, the program for carrying out various types of settings of the PLC 20, and the like.

With reference to FIG. 4, the display program includes a simulation unit 102, an FB library 103, a command value calculation unit 104, a command position calculation unit 105, a predicted position calculation unit 106, a trace data storage unit 107, a display data processing unit 108, a display control unit 109, and an accepting unit 110. The predicted position calculation unit 106 includes a motor current calculating section 161, a torque value calculating section 162, a motor DB (Data Base) 163, a motion equation calculating section 164, and a device DB 165.

The sequence program 101 is created by the user. The sequence program 101 is provided to the simulation unit 102. The sequence program 101 is not a part of the display program.

The simulation unit 102 functions as a simulator of the PLC 20, and executes the sequence program 101. In the simulation unit 102, a program for providing input data to the simulation unit 102 is used in combination with the sequence program 101 in place of the actual control target, when necessary. The simulation unit 102 provides the information specifying the motion FB to be executed and the parameter necessary for the execution of the motion FB to the command value calculation unit 104 at a stage to execute the motion FB included in the sequence program 101.

The FB library 103 is stored in the HDD 904 of the PC 10, and accumulates a wide variety of FB as an executable program.

The FB library 103 is also provided in the PLC 20 to be used when the PLC 20 executes the motion program. The motion FB for calculating the command value causes the PLC 20 to operate in the following manner until the terminating conditions are set when the execution is started in the PLC 20. In other words, the motion FB for calculating the command value causes the PLC 20 to operate so that the PLC 20 calculates the command value for every constant control period of the PLC 20 based on the provided parameter, and outputs the calculated command value.

The command value calculation unit 104 reads out the necessary motion FB from the FB library 103. The command value calculation unit 104 simulates the FB execution in the PLC 20. The command value calculation unit 104 outputs a series of command values corresponding to the output for every control period in the PLC 20.

The command position calculation unit 105 calculates the command position to be displayed as a trajectory from the command value. The command position is a position of a specific portion of the control target based on the output command value when the mass and the friction of the control target are ignored. In other words, the command position is the position of the specific portion of the control target to be realized by a series of provided command values when the mass and the friction of the control target are ignored. The phrase "series of command positions" means the positions of the specific portion of the control target based on the series of output command values when the mass and the friction of the control target are ignored. The command position calculation unit 105 corresponds to a "first position acquiring unit".

For instance, the command value and the command position of one axis may be corresponded in a one-to-one relationship when calculating an X coordinate of a table from the command value for providing a rotation angle of the motor of the X axis of the XY table. Furthermore, the command value may be used the command position.

The command value (θ value or R value) for drive and the command position (X value or Y value) for display may not be corresponded in a one-to-one relationship when the command position at the distal end of the robot arm driven by the command value of the θR polar coordinate system configured by a vertical rotation axis and a horizontal linear movement axis attached thereto is displayed in the XY orthogonal coordinate system.

The command position calculation unit 105 may not calculate the command position by the execution simulation of the PLC 20, and the PC 10 may acquire the series of command values for the control calculated by the PLC 20, and the command position calculation unit 105 may calculate the command position for trajectory display.

When the command position calculation unit 105 calculates the command position by simulation, the execution simulation of the PLC 20 and the calculation of the command position and the drawing of the trajectory do not necessarily need to be performed in the same computer. For instance, the PC 10 may acquire the command position calculated by another computer and perform the drawing of the trajectory based on such command position. In such a case, the communication interface or the storage medium interface for acquiring the command position from another computer corresponds to the "first position acquiring unit".

The predicted position calculation unit 106 calculates the predicted position of the specific portion of the control target to be displayed as a trajectory from the provided command value. In the process, the predicted position calculation unit 106 reads out the necessary data from the motor DB 163 storing the data related to the specification of the motor and the device DB 165 storing the data related to the specification of the control target, and uses the read data. The predicted position calculation unit 106 corresponds to a "predicted position acquiring unit".

The calculation of the predicted position and the drawing of the trajectory do not necessarily need to be performed in the same computer. For instance, the PC 10 may acquire the predicted position calculated by another computer and perform the drawing of the trajectory. In such a case, the communication interface or the storage medium interface for acquiring the predicted position from another computer corresponds to the "predicted position acquiring unit".

The motor current calculating section 161 calculates the current value to supply to the servo motors 41 to 34 from the provided command value.

The torque value calculating section 162 calculates a torque value exhibited by the servo motor from the provided current value and the motor torque coefficient of the servo motor read out from the motor DB 163.

The motion equation calculating section 164 calculates a predicted position from the provided torque value, the value of moment of inertia, dynamic friction coefficient and the like of the servo motor read out from the motor DB 163, and the value of moment of inertia, the dynamic friction coefficient, and the like of the portion driven by the servo motor of the control target read out from the device DB 165.

The control system model of the servo motor required when calculating the current value from the command value is generally publicized as a block diagram for every servo amplifier, where the information of the block diagram is incorporated in a display program.

The torque value calculating section 162 calculates the torque value Tm of the motor according to the following equation (1).

$$T_m = K_T I \quad (1)$$

wherein $K_T$ is the motor torque coefficient, which is a constant for every motor; and I is the motor current.

When the motion equation calculating section 164 obtains the predicted position, a motion equation assuming a product of the moment of inertia (i.e., moment of mass) and angular acceleration is equal to a force generated by the motor torque, various types of frictions, and the like can be used. In other words, the predicted position is a position of a specific portion of the control target based on the series of command values when a simulation that takes into consideration at least one of the mass and the friction of the control target is performed.

For instance, the motion equation of the motor shaft is expressed with the following equation (2).

$$I_m \theta'' = T_m - k_m \theta' - \mu_m N_m \quad (2)$$

wherein $I_m$ is the moment of inertia of the motor, $\theta$ is the rotation angle of the motor;

$\theta'$ is the derivative of $\theta$, that is, the rotation speed of the motor;

$\theta''$ is the second derivative, that is, the rotation angular acceleration of the motor;

$T_m$ is the torque value of the motor;

$k_m$ is the viscosity friction coefficient of the motor;

$\mu_m$ is the dynamic friction coefficient of the motor; and $N_m$ is the normal force of the motor.

$I_m$, $k_m$, $\mu_m$, $N_m$ are coefficients defined for every motor, and are acquired from the motor DB 163. The rotation angle $\theta$ of the servo motors 41 to 43 corresponds to the predicted position. When having the position of the specific portion driven by the motor as the predicted position to be displayed as a trajectory, an appropriate conversion is performed from the rotation angle $\theta$ of the servo motors 41 to 43, and the value after the conversion is assumed as the predicted position.

The motion equation may also take into consideration a constant of the driving device driven by the servo motors 41 to 43. For instance, the motion equation of when a decelerator is connected to the servo motors 41 to 43 is expressed with the following equation (3).

$$I_G \theta_G'' = T_G - C_G \theta_G' - \mu_G N_G \quad (3)$$

wherein $I_G$ is the moment of inertia of the decelerator;

$\theta_G$ is the rotation angle of the decelerator;

$\theta_G'$ is the rotation angular speed of the decelerator;

$\theta_G''$ is the rotation angular acceleration of the decelerator;

$T_G$ is the drive torque of the decelerator calculated by $T_G = n_G H_G T_m$, $T_m$ being the torque value of the motor, $n_G$ being the transmission efficiency, $H_G$ being the transmission magnification of force, $C_G$ is the viscosity friction coefficient of the barrel inside the decelerator;

$\mu_G$ is the dynamic friction coefficient of the decelerator, and $N_G$ is the normal reaction of the decelerator.

$I_G$, $n_G$, $H_G$, $C_G$, $\mu_G$, $N_G$ are coefficients defined for every decelerator, and are acquired from the device DB 165. The rotation angle $\theta_G$ of the decelerator corresponds to the predicted position. When having the position of the device site driven by the motor through the decelerator as the predicted position to be displayed as a trajectory, an appropriate conversion is performed from the rotation angle $\theta_G$ of the decelerator, and the value after the conversion is assumed as the predicted position.

Furthermore, the motion equation can be established in view of the constants of other structure portions driven by the servo motors 41 to 43, if necessary.

The trace data storage unit 107 stores a series of position data in which a series of command values and a series of actually measured values stored in the PLC 20 acquired from the PLC 20 are converted in advance to command positions and actually measured positions usable for trajectory display. The trace data storage unit 107 corresponds to an "actually measured position acquiring unit".

The PC 10 is assumed to include a "response position acquiring unit" if the PC 10 includes at least one of the "predicted position acquiring unit" and the "actually measured position acquiring unit".

The display data processing unit 108 receives the command position from the command position calculation unit 105, the predicted position from the predicted position calculation unit 106, the command position and the actually measured position from the trace data storage unit 107, and the input of the operation data from the accepting unit 110. The display data processing unit 108 creates various types of display data using the input data, and outputs the created various types of display data to the display control unit 109. The detailed processing content of the display data processing unit 108 will be described later.

The display control unit 109 displays the display data generated by the display data processing unit 108 on the screen 11 of the monitor 907. The display control unit 109 performs the display control of the monitor 907 in the PC 10. That is, various types of images are displayed on the screen 11 of the monitor 907 by the display control unit 109.

The accepting unit 110 accepts the selecting operation of a mark by the user. The mark will be described later.

Figure 5:
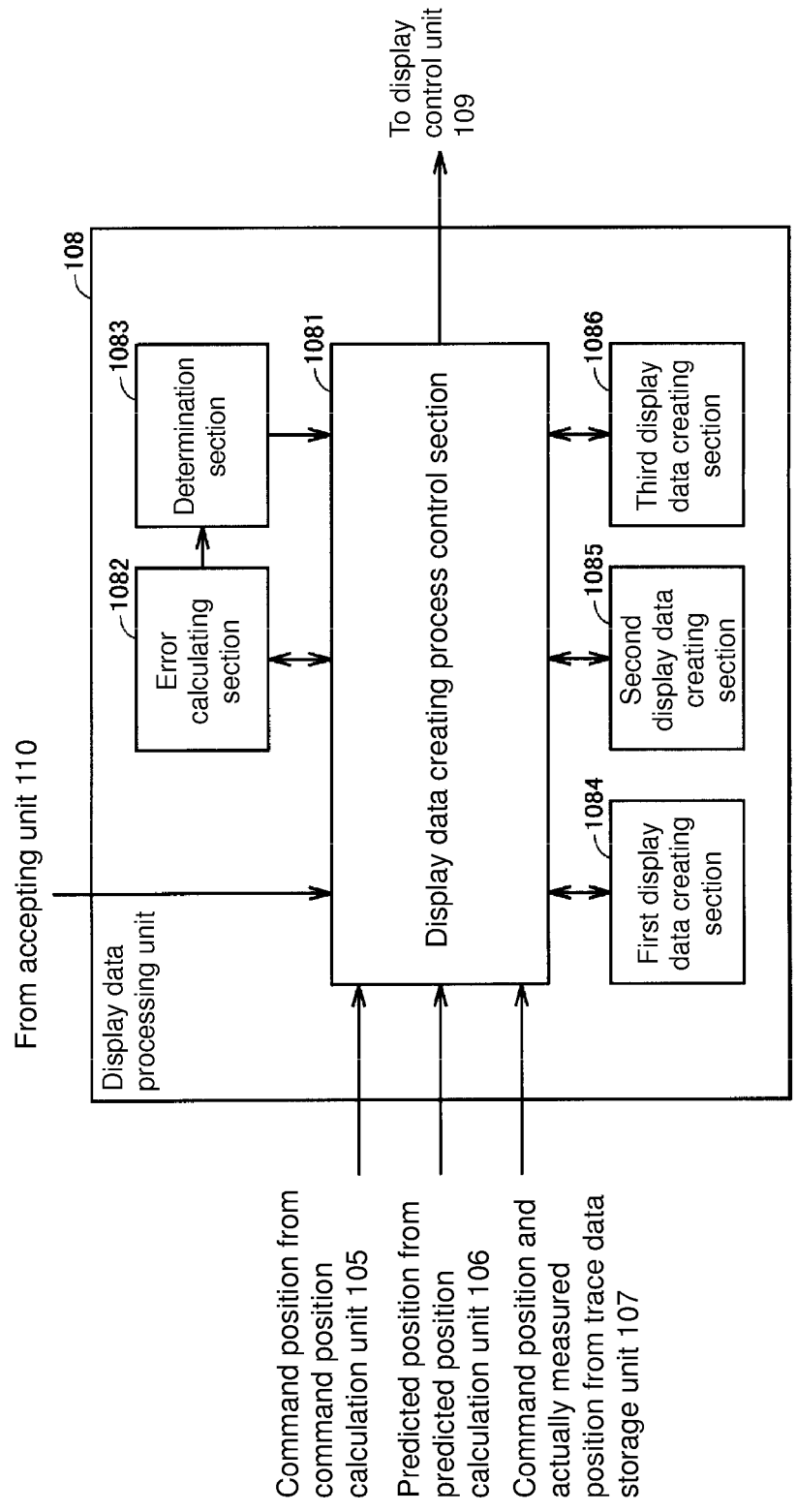
FIG. 5 is a function block diagram showing details of a display data processing unit.

FIG. 5 is a function block diagram showing details of the display data processing unit 108. With reference to FIG. 5, the display data processing unit 108 includes a display data creating process control section 1081, an error calculating section 1082, a determination section 1083, a first display data creating section 1084, a second display data creating section 1085, and a third display data creating section 1086.

The display data creating process control section 1081 carries out (I) transition control of the type of screen to display, (II) control of scroll and display magnification change, (III) control of partial rewrite of the screen content, (IV) transmission control corresponding to the screen content to display to the first, second, and third display data creating sections 1084, 1085, and 1086, and the error calculating section 1082 of the data of the input command position, predicted position, and the actually measured position, (V) transmission control to each display data creating section 1084, 1085, and 1086 of the determination content by the determination section 1083, and (VI) transmitting control to the display control unit 109 of the display data created by each display data creating section 1084, 1085, and 1086 based on the operation data input from the accepting unit 110.

The error calculating section 1082 calculates the difference in position of the command position and the predicted position or actually measured position corresponding to the command position.

The determination section 1083 determines whether or not the difference calculated by the error calculating section 1082 is greater than or equal to a threshold value defined in advance.

The first display data creating section 1084 creates data for displaying at least one of the spatial trajectory formed by the series of command positions, the spatial trajectory formed by the series of predicted positions, and the spatial trajectory formed by the series of actually measured positions on the screen. The spatial trajectory may be two dimensional or three dimensional. The two dimensional spatial trajectory is obtained by projecting the trajectory in a three-dimensional space on the plane. The first display data creating section 1084 further creates data for displaying on the screen an error occurrence mark indicating the portion where the error determined by the determination section 1083 is greater than or equal to the threshold value.

The second display data creating section 1085 creates data for displaying each spatial trajectory on the screen in a mode in which the spatial trajectory of the command position in the portion corresponding to the error occurrence mark selected by the operation of the user and the spatial trajectory of the predicted position or the actually measured position corresponding to the relevant spatial trajectory of the command position are enlarged at the same magnification, the mode being such that each enlarged spatial trajectory overlaps each other. The spatial trajectory may be two dimensional or three dimensional.

The third display data creating section 1086 creates data for displaying a two-dimensional graph having a first axis, for example, a horizontal axis as time or displacement. A second axis, for example, a vertical axis of the two-dimensional graph is selected from the following types. A first mode of the vertical axis is the command position, the predicted position, or the actually measured position, or the velocity of the specific portion of the control target calculated based on one of such positions. The second mode of the vertical axis is the magnitude of the difference calculated by the error calculating section 1082. The third mode of the vertical axis is the distance from the spatial trajectory of the command position to the spatial trajectory of the predicted position or the actually measured position along a direction perpendicular to the tangential direction of the spatial trajectory of the command position. The third display data creating section 1086 further creates data for displaying on the two-dimensional graph the error occurrence mark indicating the portion where the error determined by the determination section 1083 is greater than or equal to the threshold value.

FIG. 6 is a view showing one example of a data structure of the motor DB 163. With reference to FIG. 6, the motor DB 163 stores a motor type of a servo motor, rated output, moment of inertia, viscosity friction coefficient, dynamic friction coefficient, and the like in a table format in association with each other. The device DB 165 also stores various constants for every control target in a table format, similar to the motor DB 163.

Figure 7:
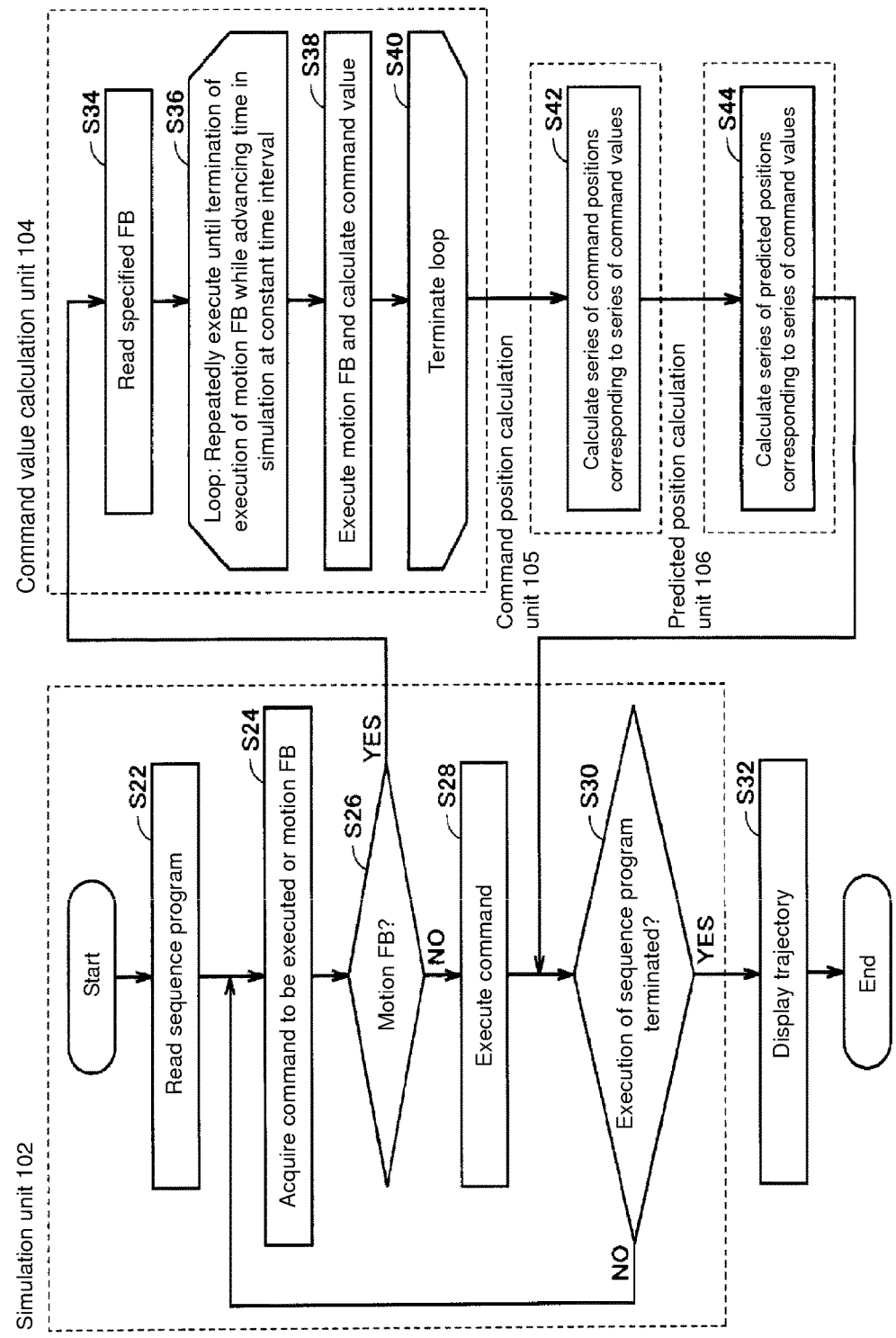
FIG. 7 is a flowchart showing a process of displaying a predicted position.

FIG. 7 is a flowchart showing a process of displaying a predicted position. With reference to FIG. 7, the simulation unit 102 reads out the sequence program 101 in step S22. In step S24, the simulation unit 102 acquires the command to be executed or the motion FB. In step S26, the simulation unit 102 determines whether or not the acquired data is the motion FB.

If determined as not the motion FB (NO in step S26), the simulation unit 102 executes the acquired command in step S28. In step S30, the simulation unit 102 determines whether or not the execution of the sequence program 101 is terminated. If the simulation unit 102 determines that the execution of the sequence program 101 is terminated (YES in step S30), the display control unit 109 displays the trajectory on the screen 11 in step S32. If the simulation unit 102 determines that the execution of the sequence program 101 is not terminated (NO in step S30), the process proceeds to step S24.

If determined as the motion FB by the simulation unit 102 (YES in step S26), the command value calculation unit 104 reads the motion FB specified from the simulation unit 102 from the FB library 103 in step S34.

The command value calculation unit 104 starts a loop process in step S36, and the command value calculation unit 104 terminates the loop process in step S40. In the relevant loop process, the process is repeatedly executed until the termination of the read motion FB while advancing the time in simulation at a constant time interval. During the loop process, the command value calculation unit 104 repeats the process of executing the motion FB and calculating the command value in step S38.

In step S42, the command position calculation unit 105 calculates a series of command positions corresponding to a series of command values. In step S44, the predicted position calculation unit 106 calculates a series of predicted positions corresponding to a series of command positions.

Figure 8:
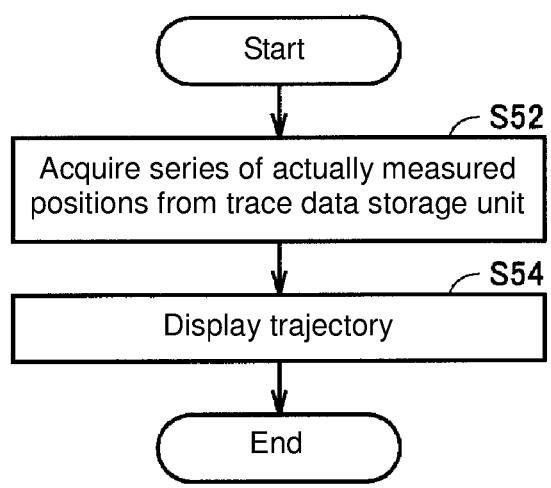
FIG. 8 is a flowchart showing a process of displaying an actually measured position.

FIG. 8 is a flowchart showing a process of displaying an actually measured position. With reference to FIG. 8, the display data processing unit 108 acquires a series of actually measured positions from the trace data storage unit 107 in step S52. In step S54, the display control unit 109 displays the actually measured position acquired by the display data processing unit 108 on the screen 11 of the monitor 907.

Figure 9:
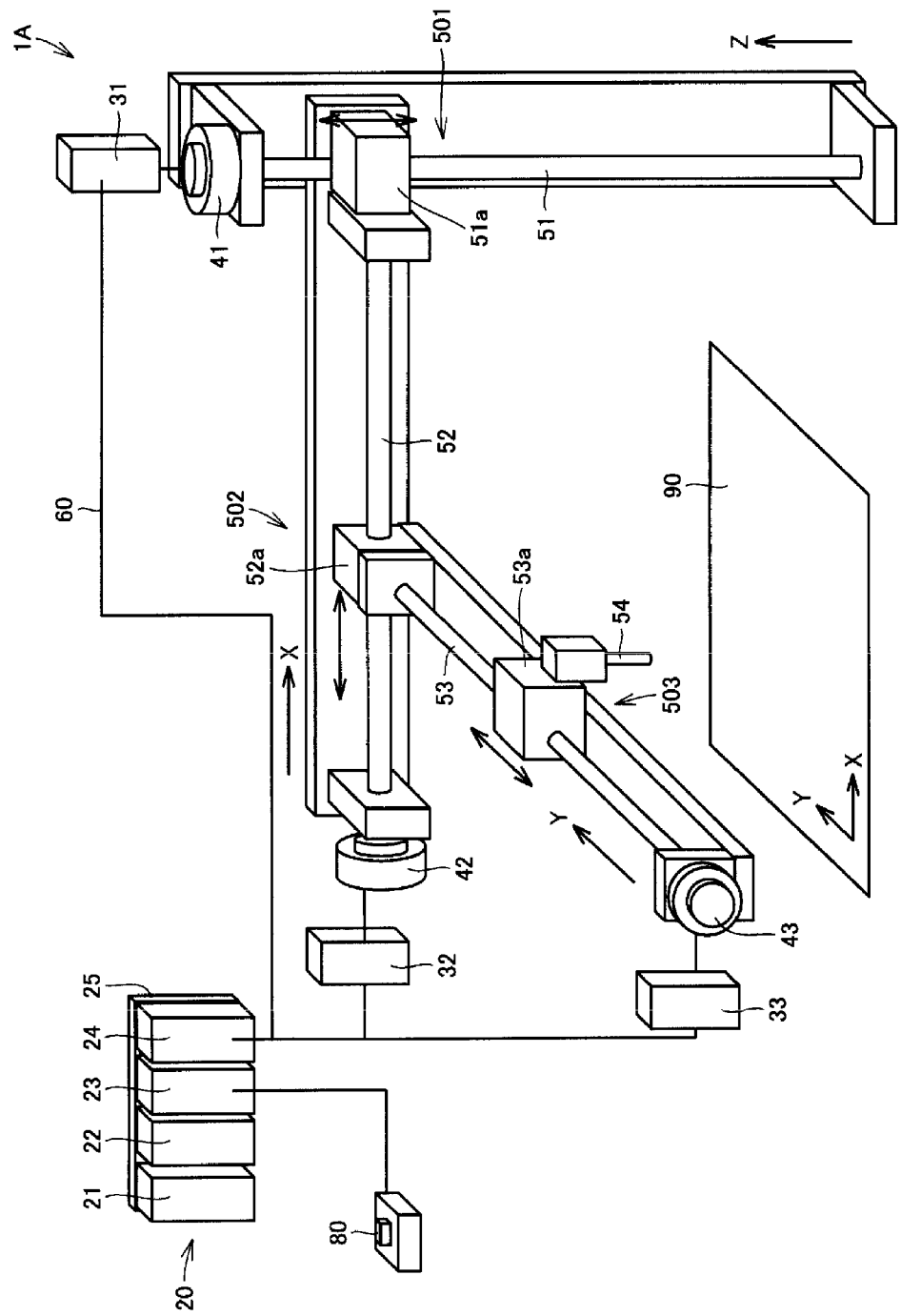
FIG. 9 is a view showing a schematic configuration of a board cutting device 1A, which is an application example of the control system.

FIG. 9 is a view showing a schematic configuration of a board cutting device 1A, which is an application example of the control system 1. With reference to FIG. 9, the board cutting device 1A includes the PC 10 (not shown), the PLC 20, the servo amplifiers 31 to 33, the communication line 60, and uniaxial stage mechanisms 501 to 503, which are movable mechanisms of the control target.

The stage mechanism 501 in the Z direction includes the servo motor 41 and a feeding screw 51. The feeding screw 51 includes a nut 51a to be screw fitted to a screw shaft. The stage mechanism 502 in the X direction includes the servo motor 42 and a feeding screw 52. The feeding screw 52 includes a nut 52a to be screw fitted to a screw shaft. The stage mechanism 503 in the Y direction includes the servo motor 43, a feeding screw 53, and a cutter 54. The feeding screw 53 includes a nut 53a to be screw fitted to a screw shaft. The cutter 54 is fixed to the nut 53a.

The cutter 54 has the cutting edge directed in the negative direction of the Z axis (direction of the board 90). The cutter 54 is movable in the X axis direction, the Y axis direction and the Z axis direction by the driving of the servo motors 41 to 43. The cutter 54 is arranged to cut the board 90.

Figure 10:
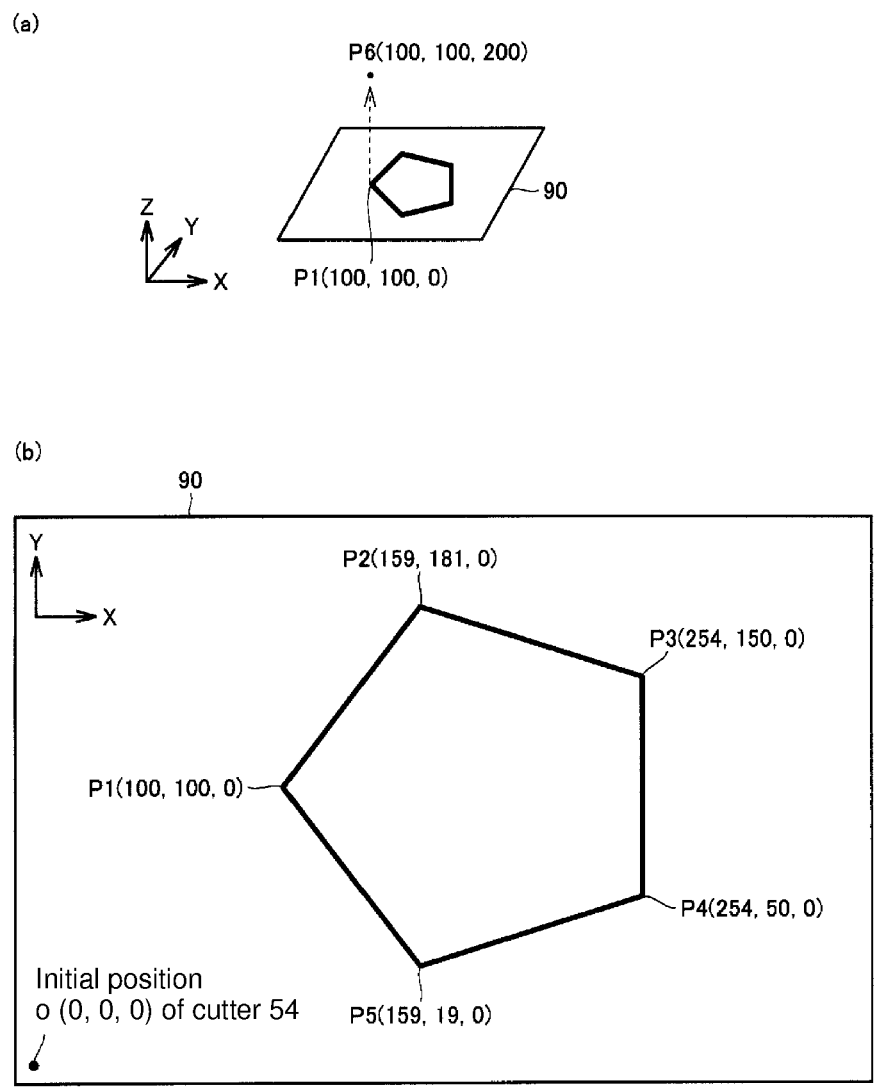
FIGS. 10A and 10B are views showing an example of a board cut by a board cutting device.

FIGS. 10A and 10B are views showing a example of the board 90 cut by the board cutting device 1A. With reference to FIGS. 10A and 10B, when a switch 80 of FIG. 9 is turned ON, the board cutting device 1A moves the cutter 54 waiting at an initial position O (0, 0, 0) to P6. Thereafter, the board cutting devices 1A lowers the cutter 54 to the board 90, and moves the cutter 54 in the order P1→P2→P3→P4→P5→P1. The board cutting devices 1A cuts the board 90 with such movement. Thereafter, the board cutting device 1A raises the cutter 54 and moves the same to P6, and terminates the cutting process.

FIG. 11 to FIG. 14 are views showing one example of a motion program for causing the board cutting device 1A of FIG. 9 to execute the board cutting process shown in FIGS. 10A and 10B. In the motion program, the description on the process of aligning the position of the cutter 54 to the initial position O (0, 0, 0) at the start of the operation and the description on returning the cutter 54 to the initial position O (0, 0, 0) after the completion of the operation are omitted.

In the motion program, FB 1 to FB 13 are motion FBs. A terminal on the left side of the FB is the input to the FB, and a terminal on the right side of the FB is the output from the FB. The actually commercialized FB includes a greater number of input terminals and output terminals and enables a variety of settings, but the terminals not used in the description will not be illustrated. The illustrated output from the FB is the output with respect to other portions of the sequence program. When the motion FB is executed in the PLC 20, the calculated command values and the other signals with respect to the servo amplifiers 31 to 33 are output from the MC unit 24. However, the process of outputting the command value and the signal is the function on the MC unit of the FB. Thus, the relevant function is not expressed in the notation of the sequence program.

The unit of a numerical value of the position input to the FB is mm, and the unit of the numerical value of the velocity is mm/sec. As a result of executing the FB, the command value actually transmitted from the MC unit 24 to the servo amplifiers 31 to 33 is converted to a value representing the rotation angle of the motor.

Figure 11:
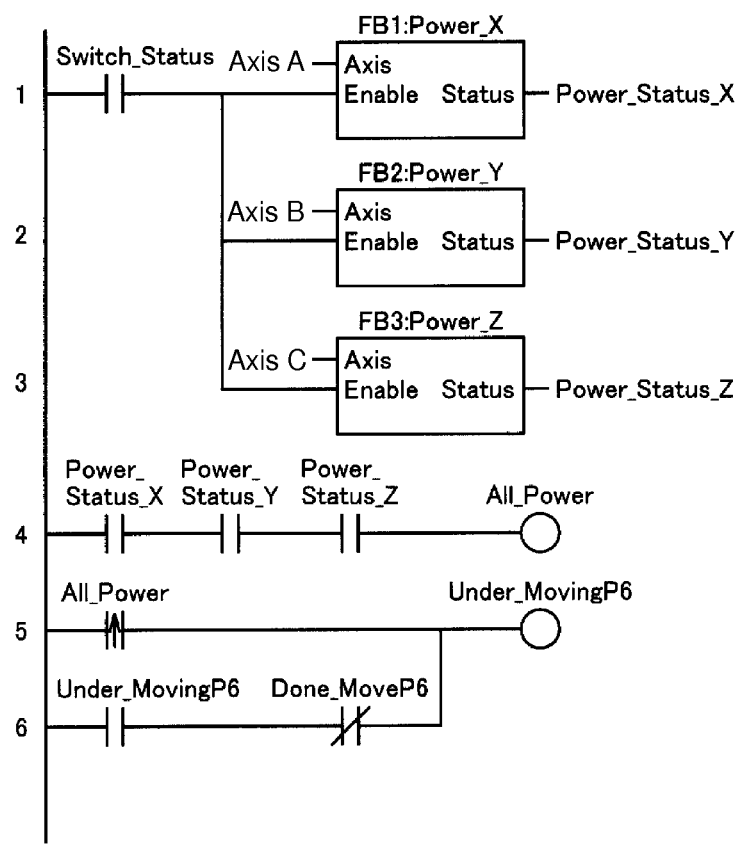
FIG. 11 is a view showing a first portion of a motion program.

FIG. 11 is a view showing a first portion of the motion program. With reference to FIG. 11, each row of the motion program is described with the following processes (A) to (C).

(A) First to third rows: When contact Switch_Status is turned ON (when the switch 80 of FIG. 9 is turned ON), the servo motors 41 to 43 connected to the respective axes X, Y, Z are in an operable state.

(B) Fourth row: When all the servo motors 41 to 43 of the three axes are in the operable state, the coil All_Power is turned ON.

(C) Fifth to sixth rows: Whether or not the cutter 54 is moving to a coordinate P6 of FIG. 10A is determined. The coil Under_Moving P6 is turned ON when all the servo motors 41 to 43 are in the operable state.

Figure 12:
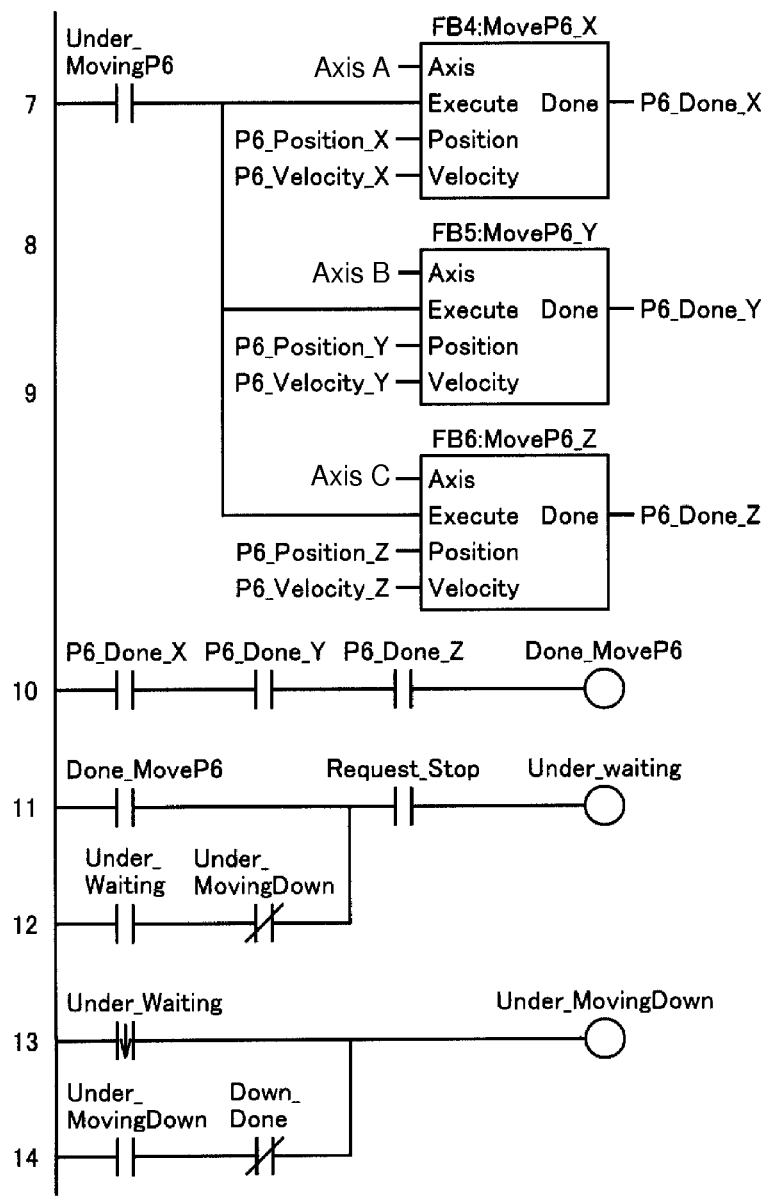
FIG. 12 is a view showing a second portion of the motion program following FIG. 11.

FIG. 12 is a view showing a second portion of the motion program following FIG. 11. With reference to FIG. 12, each row of the motion program is described with the following processes (D) to (G).

(D) Seventh to ninth rows: The cutter 54 is moved to the coordinate P6 of FIG. 10A. FB 4, FB 5, and FB 6 are FBs for calculating a series of command values for one axis. Axis is a terminal for inputting the specification of the axis, where AxisA input from the relevant terminal means specifying the X axis, Axis B means specifying the Y axis and AxisC means specifying the Z axis. Position is a terminal for inputting the coordinate of the moving destination, and Velocity is a terminal for inputting the specification of the moving velocity. The specified coordinate is as shown in FIGS. 10A and 10B. For instance, since the XYZ coordinate of P6 is (100, 100, 200), 100 is given as the value of P6_Position_X. The values of P6_Velocity_X, P6_Velocity_Y, P6_Velocity_Z are respectively 41, 41, 82.

(E) Tenth row: Whether or not each axis of X, Y, Z completed the movement to the coordinate P6 is determined.

(F) Eleventh to twelfth rows: Whether or not the process is in waiting is determined. After the movement to the coordinate P6 is completed and a stop request (Request_Stop) is input from outside, the coil Under_Waiting is turned ON.

(G) Thirteenth to fourteenth rows: Whether or not lowering to the coordinate P1 is determined. When the waiting state is released, the coil Under_MovingDown is turned ON.

Figure 13:
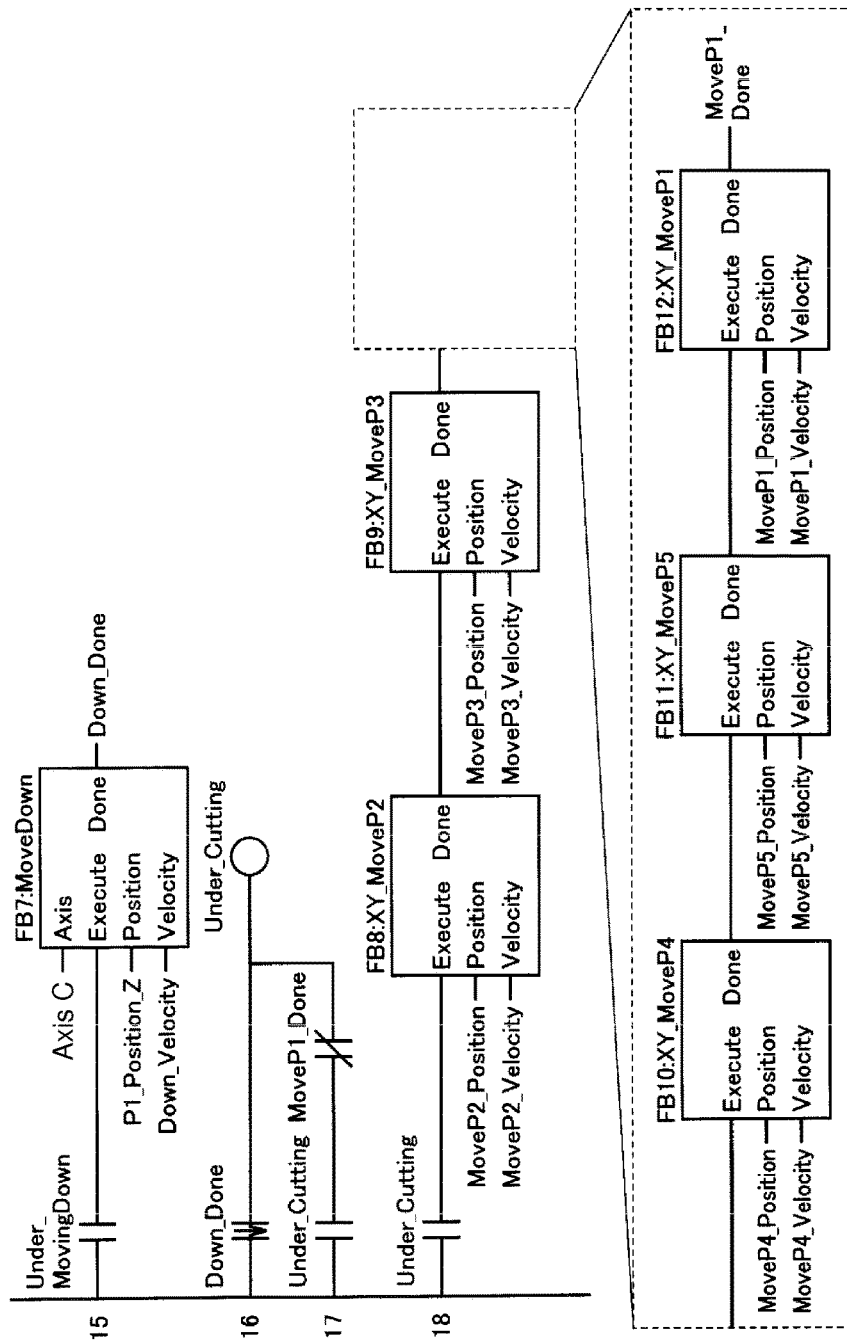
FIG. 13 is a view showing a third portion of the motion program following FIG. 12.

FIG. 13 is a view showing a third portion of the motion program following FIG. 12. With reference to FIG. 13, each row of the motion program is described with the following processes (H) to (J).

(H) Fifteenth row: Lowering operation of the cutter 54 (movement from P6 to P1) to the board 90 is executed. The FB 7 is the FB for calculating a series of command values for one axis. The Z axis is specified by the input of AxisC. The value of P1_Position_Z is 0 and the value of Down_Velocity is 100.

(I) Sixteenth to seventeenth rows: Whether or not the process is in the cutting operation is determined. The coil Under_Cutting is turned ON when the cutter lowering operation to the coordinate P1 is completed, and the coil Under_Cutting is turned OFF when the cutter 54 is again returned to the coordinate P1 after cutting each side of the pentagon.

(J) Eighteenth row: The cutter 54 is moved in the order of the coordinates P1→P2→P3→P4→P5→P1. The FB 8 to FB 12 are FBs for simultaneously driving the X axis and the Y axis so as to move along a line connecting an execution start position of the FB and the specified execution end position. The value of MoveP2_Position of the input of the FB 8 is the XY coordinate (159, 181) of the P2. MoveP2_Velocity is the moving velocity along the line from P1 to P2. The values of the moving velocity input to the FB 8 to FB 12 are all 100.

Figure 14:
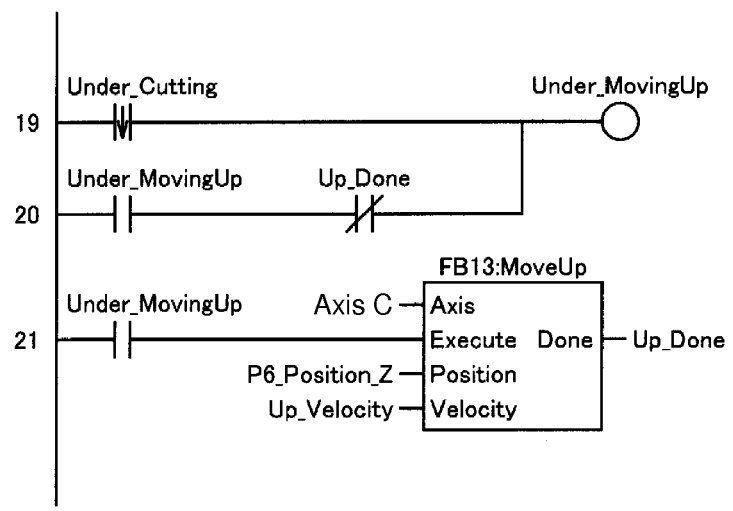
FIG. 14 is a view showing a fourth portion of the motion program following FIG. 13.

FIG. 14 is a view showing a fourth portion of the motion program following FIG. 13. With reference to FIG. 14, each row of the motion program is described with the following processes (K), (L).

(K) Nineteenth to twentieth rows: Whether or not the cutter 54 is in the rising operation is determined.

(L) Twenty-first row: The rising operation (movement from P1 to P6) of the cutter 54 is executed. The value of Up_Velocity is 100.

Figure 15:
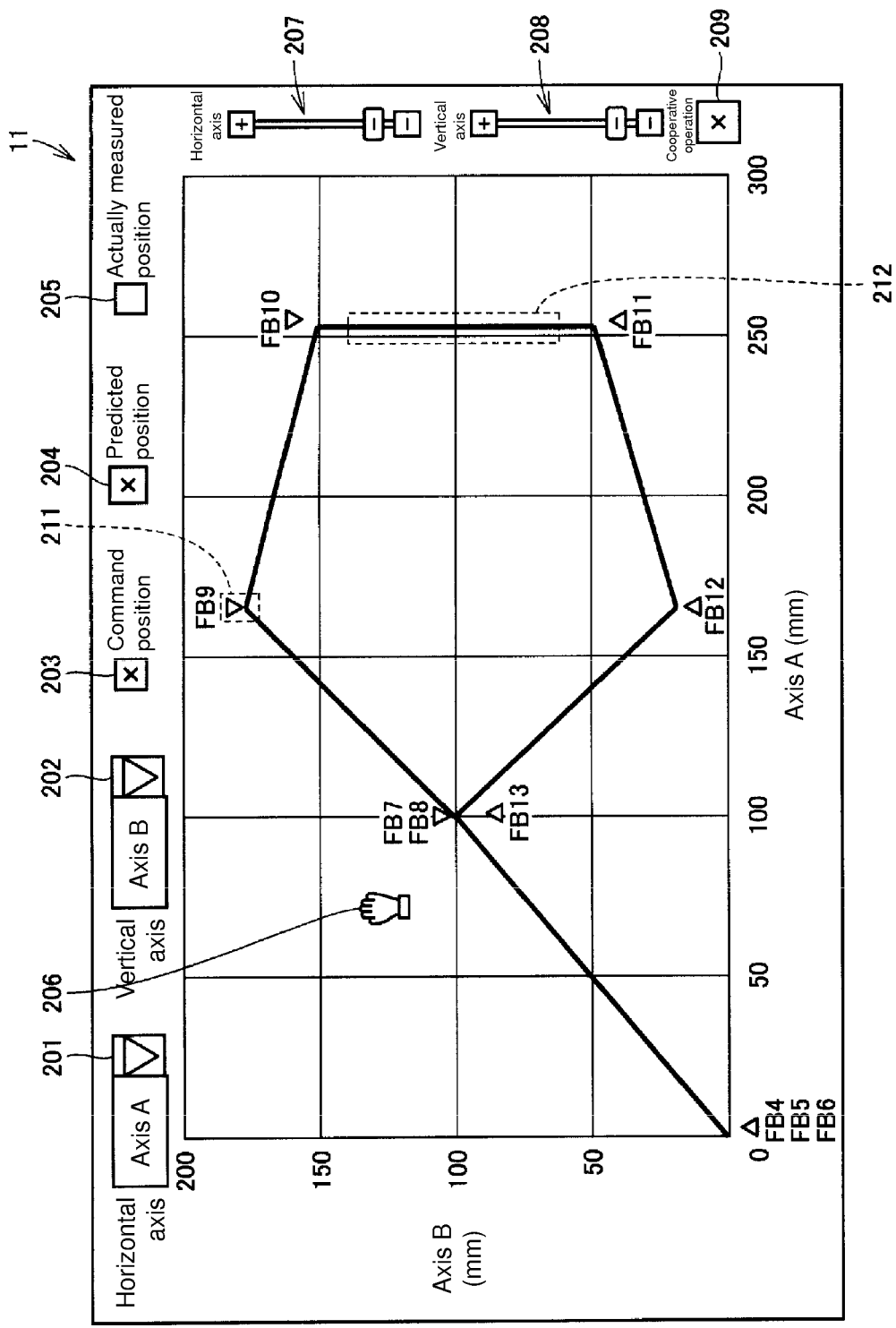
FIG. 15 is a graph displaying a trajectory of a command position when the motion programs of FIG. 11 to FIG. 14 are executed with a horizontal axis as axis A and a vertical axis as axis B.

FIG. 15 is a graph displaying the trajectory of the command position when the motion programs of FIG. 11 to FIG. 14 are executed with the horizontal axis as axis A and the vertical axis as axis B. With reference to FIG. 15, the axis A and the axis B are axis names used inside the MC unit, and correspond to the axis (X axis) of the feeding screw 52 and the axis (Y axis) of the feeding screw 53 of FIG. 9. The user can specify an arbitrary axis from the axis A (X axis), the axis B (Y axis), and the axis C (Z axis) for the horizontal axis and the vertical axis by pull-down menus 201, 201 at the upper part of the screen 11.

The user can select the trajectory to be displayed for the command position, the predicted position and the actually measured position by selection checkboxes 203 to 205 at the upper part of the screen 11.

The PC 10 displays the trajectory of the command position with a dotted line, and the trajectory of a response position (predicted position or actually measured position) with a solid line on the screen 11. In FIG. 15, the PC 10 displays the command position and the predicted position, but both trajectories are overlapped so that only the solid line appears to be displayed to the user. The error that occurs between the command position and the response position in the operation in a range of a few 100 mm is generally about a few dozen μm, and the user cannot confirm the error with the scale of the graph capable of displaying the entire trajectory as in FIG. 15. The PC 10 may omit the displaying process itself of either trajectory if the scale is such that the trajectories are overlapped and the two trajectories cannot be identified.

"FB 9☐" and the like displayed at the side of the trajectory represent the position when the execution of the displayed motion FB is started (position when the previously executed FB is terminated).

A field changing hand 206 is one type of mouse pointer, and can move a display range of the graph when the trajectory extends out of the frame of the graph. When the user drags the mouse on the graph, the PC 10 changes the mouse pointer to move the displayed graph in correspondence with the movement of the mouse.

Enlarge/reduce slide bars 207, 208 respectively represent the scale of the vertical axis and the horizontal axis of the graph. The PC 10 changes the scale of the vertical axis and the horizontal axis by having the user moving a tab on the enlarge/reduce slide bar 207, 208 up and down. When the user checks a cooperative operation checkbox 209, the PC 10 causes one of the vertical axis or the horizontal axis to follow so as to be the same scale when the scale of the other one of the vertical axis or the horizontal axis is changed. If the cooperative operation is released, the user can independently change the scale of the vertical axis and the horizontal axis.

Error occurrence marks 211, 212 are marks indicating the part of the trajectory where the error is large. In other words, the error occurrence marks 211, 212 are marks indicating a portion where the error is greater than or equal to a threshold value defined in advance. Hereinafter, the part where the error is large is also referred to as "portion where the error is determined to be occurring" or "portion where the error is occurring". The determination criterion will be described later.

The PC 10 displays the part where the error is large as a part surrounded with a dotted rectangle. The part where the error is large intermittently exists in a great number of positions on a path from the FB 10 to the FB 11, but the PC 10 displays one rectangular figure so as to surround the same as shown in the FIG. 1 if the error occurring portions are close to each other. The shape and hue of the error occurrence marks 211, 212 can be arbitrarily designed so that visible recognition is facilitated.

The PC 10 can change the hue of the portion of the trajectory where the error is determined to be occurring, and display the portion of the trajectory where the hue is changed as the error occurrence mark. In this case, if the length of the portion where the error is occurring is short, it is difficult for the user to visibly recognize if the hue is changed only at the relevant portion. Thus, the PC 10 preferably changes the hue over a length of an extent so that the relevant portion can be easily visibly recognized regardless of the length of the portion of the trajectory where the error is actually occurring when changing the hue of the trajectory.

The PC 10 may display the figure or the error occurrence marks 211, 212 when changing the hue of the portion of the trajectory where the error is determined to be occurring.

When the user clicks the error occurrence marks 211, 212, the PC 10 carries out a screen transition, and displays a portion where the error is occurring in an enlarged manner.

Figure 16:
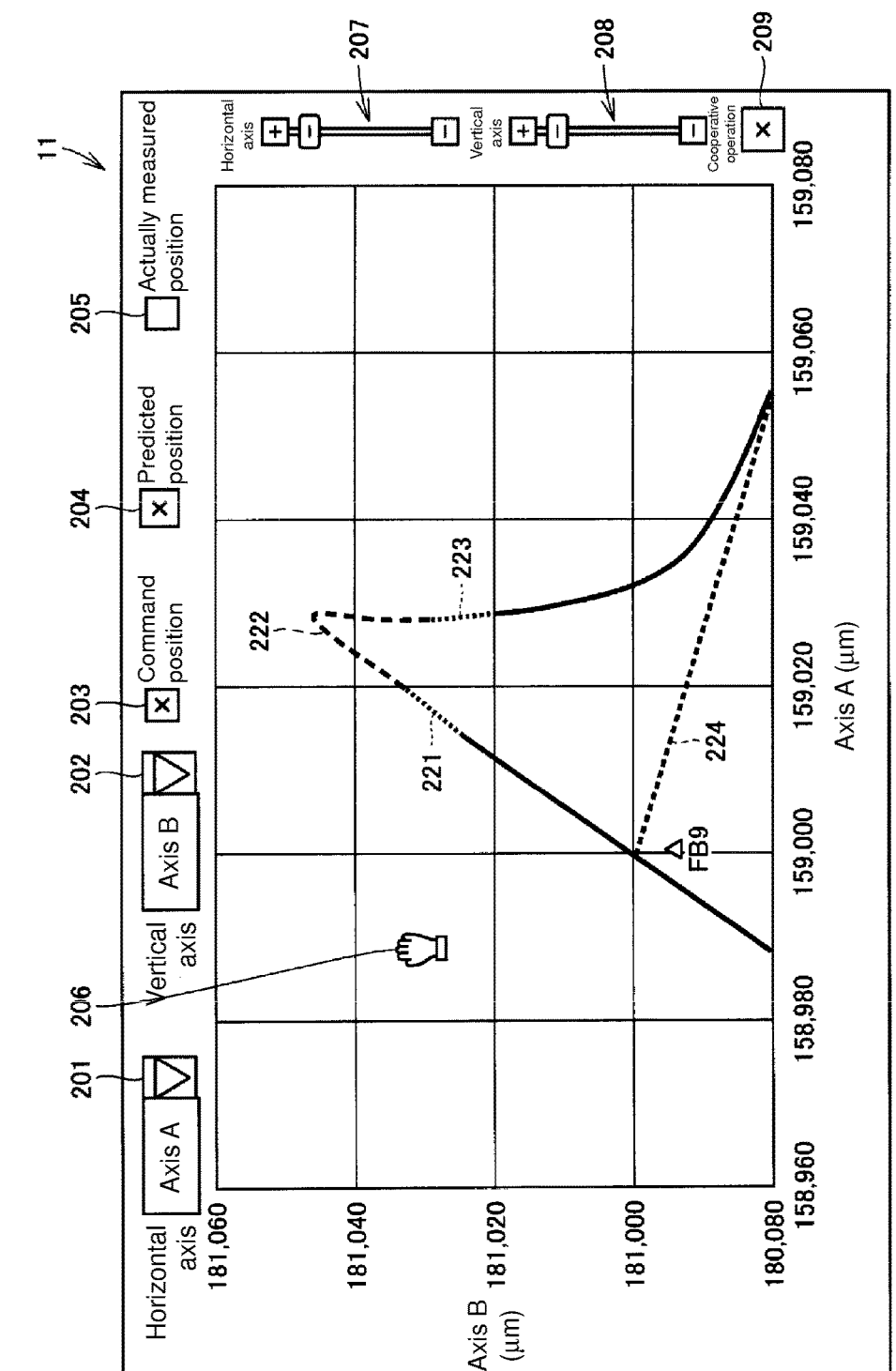
FIG. 16 is an enlarged graph displayed by the PC 10 when a user clicks the error occurrence mark 211 near the FB 9 of FIG. 15.

FIG. 16 is an enlarged graph displayed by the PC 10 when the user clicks the error occurrence mark 211 near the FB 9 of FIG. 15. With reference to FIG. 16, the PC 10 displays the portion of the trajectory of the response positions (predicted positions in this case) 221 to 223 where the error is large with respect to the command position 224 while changing the hue in two stages in accordance with the size of the error. The PC 10 changes the hue in such manner to display the size of the error on the trajectory of the response position in a state clear to the user.

The PC 10 automatically adjusts the display scale of the enlarged graph to the size suitable for observing the occurrence status of the error. For instance, the PC 10 obtains the scale width of the vertical axis with the following method assuming the displayed scale number is a fixed value.

Scale width of vertical axis=(maximum value of vertical axis−minimum value of vertical axis)/scale number wherein maximum value of vertical axis=max (maximum value of axis B of response value in an extracted zone, maximum value of axis B of command value in the extracted zone); and minimum value of vertical axis=min (minimum value of axis B of response value in the extracted zone, minimum value of axis B of command value in the extracted zone).

The PC 10 adjusts the display such that the scale width becomes a value in which the power of 10 is multiplied to 1, 2, or 5. The PC 10 performs the process similar to the vertical axis on the horizontal axis.

Thereafter, the user can manually change the scale using the enlarge/reduce slide bars 207, 208. The user can uncheck the cooperative operation checkbox 209, and independently change the scales of the vertical axis and the horizontal axis. In this case as well, the scale is changed in both the command position trajectory and the response position trajectory, so that the scales of the vertical axis and the scales of the horizontal axis of the command position trajectory and the response position trajectory are the same.

The PC 10 enlarges the trajectories at the same magnification and displays the same on the screen 11 in a mode where the portion of the spatial trajectory of the command position corresponding to the selected error occurrence mark and the portion of the spatial trajectory of the response position corresponding thereto are overlapped. More specifically, the PC 10 displays each spatial trajectory on the screen 11 in a mode where the portion of the spatial trajectory of the command position corresponding to the selected error occurrence mark and the portion of spatial trajectory of the response position corresponding to the relevant portion of spatial trajectory are enlarged at the same magnification, the mode being such that the enlarged spatial trajectories are overlapping each other. Thus, the occurrence status of the error becomes easy to be recognized for the user.

A two-dimensional trajectory data generating section 181 basically uses the same program to create the trajectory display screen of FIG. 15 and the enlarged display screen of the trajectory of FIG. 16.

The user may manually enlarge the scale from the display screen of FIG. 15, and operate the field changing hand 206 to adjust the displaying area, so that the screen 11 shown in FIG. 16 can be displayed through manual operation. In this case, the PC 10 stops the displaying of the error occurrence mark at the stage when the size of the error becomes a size easily visibly recognizable on the graph. The PC 10 may continuously display the error occurrence mark even when such stage is reached. The first display data creating section 1084 and the second display data creating section 1085 may, of course, be realized with different programs, and assigned with the creation of the display data.

The user can cause the PC 10 to display in an enlarged manner only through the manual operation as described above, but the occurrence status of the error can be rapidly confirmed by using the screen transition performed by the click operation of the error occurrence mark. The PC 10 may be designed such that, for example, the display returns when a backspace key is pushed so that the display screen of FIG. 16 can be returned to the display screen of FIG. 15.

Figure 17:
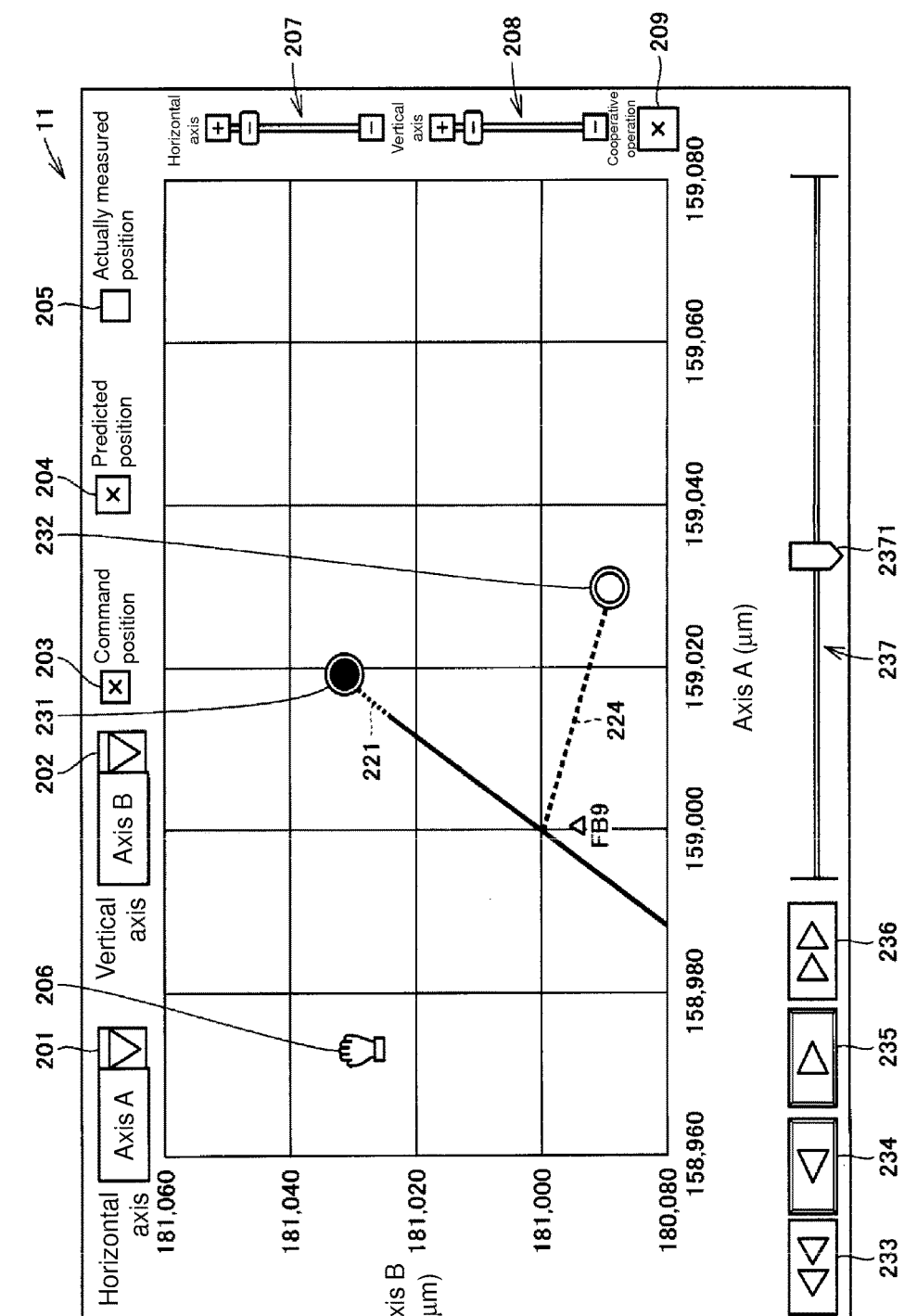
FIG. 17 is a view showing a state in which same time markers, that is, a command position marker and a response position marker are displayed on the enlarged display screen of FIG. 16.

FIG. 17 is a view showing a state in which same time markers, that is, a command position marker and a response position marker are displayed on the enlarged display screen of FIG. 16. With reference to FIG. 17, a command position marker 232 and a response position marker 231 are figures showing the command position and the response position at the same time with each other. The PC 10 displays the portion up to the marker as a trajectory, but may display the entire trajectory falling within the display range, similar to FIG. 16. The PC 10 can clearly display the position relationship between the command position and the response position at the same time with such markers.

The user performs the operation of changing the time corresponding to the marker with various types of buttons 233 to 236 on the lower left of the screen 11 and a slide bar 237 arranged next to the various types of buttons.

The length of the slide bar 237 represents the length of time from the start to the end of the execution of the motion program corresponding to one takt. A position of a tab 2371 of the slide bar 237 represents the elapsed time (time). The PC 10 displays the marker at the position on the trajectory at the relevant time. The tab 2371 can be moved left and right with the drag operation by the mouse. The PC 10 changes the position of the marker in accordance with the operation of the tab 2371 of the user.

When the user pushes the play button 235, the PC 10 moves the tab 2371 of the slide bar 237 and the position of the marker towards the right in accordance with the elapse of the actual time. When the user pushes the fast-forward button 236, the PC 10 moves the position of the tab 2371 of the slide bar 237 and the position of the marker towards the right faster than the elapse of the actual time. When the user pushes the reverse play button 234, the PC 10 moves the position of the tab 2371 of the slide bar 237 and the position of the marker towards the left in the past direction at the same pace as the elapse of the actual time. When the user pushes the rewind button 233, the PC 10 moves the position of the tab 2371 of the slide bar 237 and the position of the marker towards the left in the past direction at a pace faster than the elapse of the actual time. The PC 10 can display the slide bar 237 and the same time marker on the display screens of FIG. 15, and FIGS. 18 and 19, to be described later.

Figure 18:
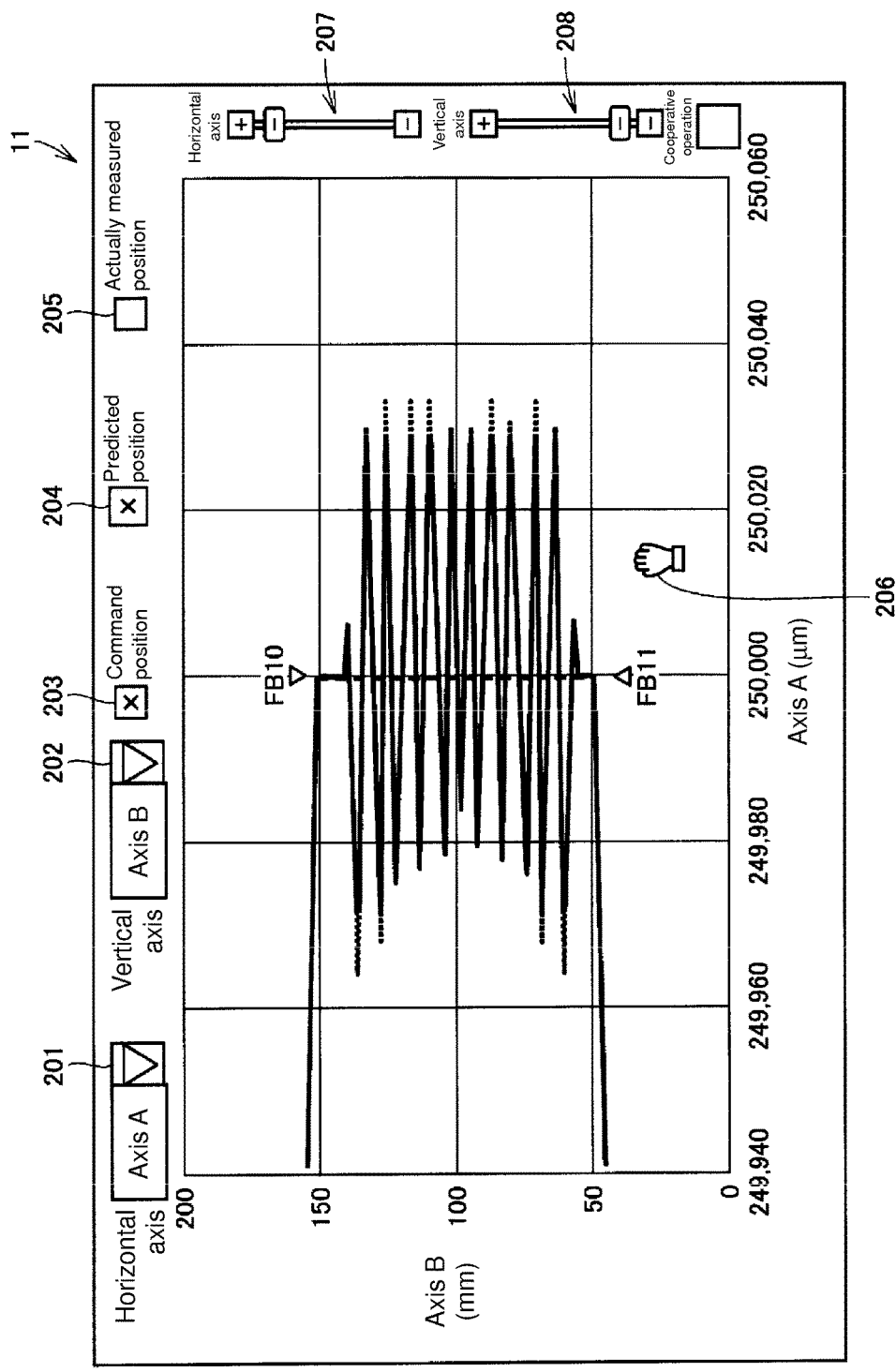
FIG. 18 is a view showing a content displayed on the screen when the user clicks the error occurrence mark between the FB 10 and the FB 11 of FIG. 15 with the cooperative operation checkbox 209 unchecked.

FIG. 18 is a view showing a content displayed on the screen 11 when the user clicks the error occurrence mark 212 between the FB 10 and the FB 11 of FIG. 15 with the cooperative operation checkbox 209 unchecked. More specifically, FIG. 18 is a view showing the screen 11 after transitioned from the display content shown in FIG. 15, the screen 11 being displayed when the horizontal axis direction is selectively enlarged at a magnification where the user can visibly recognize the error.

The PC 10 determines the display magnification in the vertical axis direction so that the entire region where the error is intermittently occurring can be displayed. When the user clicks the error occurrence mark 212 without unchecking the cooperative operation checkbox 209, the PC 10 enlarges the display in the horizontal axis direction to the size the user can visibly recognize the error occurring in the horizontal axis direction and also enlarges the display in the vertical axis direction at the same magnification as the enlarging magnification in the horizontal axis direction. Thus, the PC 10 displays only a small part of the trajectory portion where the error is occurring in the vertical axis direction.

When manually displaying the screen 11 shown in FIG. 18 from the display screen shown in FIG. 15, the user may operate the field changing hand 206 to display a midpoint of the FB 10 and the FB 11 near the middle of the screen 11 and then enlarge the scale of the horizontal axis. When manually displaying the screen 11 shown in FIG. 18 from the display screen shown in FIG. 15, the user can rapidly confirm the occurrence status of the error by using the screen transition performed by the click operation of the error occurrence mark.

The directions of the displaying vertical axis and horizontal axis may be set in arbitrary directions different from the axial direction of the coordinate system used with respect to the control of the control target such as the axis A direction and the axis B direction. For instance, if the direction of the displaying horizontal axis is set in a direction of 18 degrees in the counterclockwise direction with respect to the direction of the axis A within a plane of the axis A and the axis B, the trajectory figure displayed on the screen is displayed in a mode rotated 18 degrees in the clockwise direction with respect to the trajectory figure displayed in FIG. 15. A linear portion of the trajectory from the FB 11 to the FB 12 thus becomes parallel to the horizontal axis. If the vertical axis direction is selectively enlarged in such state, the user can observe the occurrence status of the error in a direction perpendicular to the advancing direction with respect to the trajectory between the FB 11 and the FB 12.

As described above, the PC 10 can differ the display magnification of the trajectory between one direction and a direction orthogonal to such direction. Thus, if the error occurring direction is locally substantially constant, the PC 10 can display the trajectory of a relatively wide range while showing the occurrence status of the error at a large display magnification by having the display magnification in the error occurring direction relatively large and a display magnification in the direction orthogonal to the error occurring direction relatively small.

Figure 19:
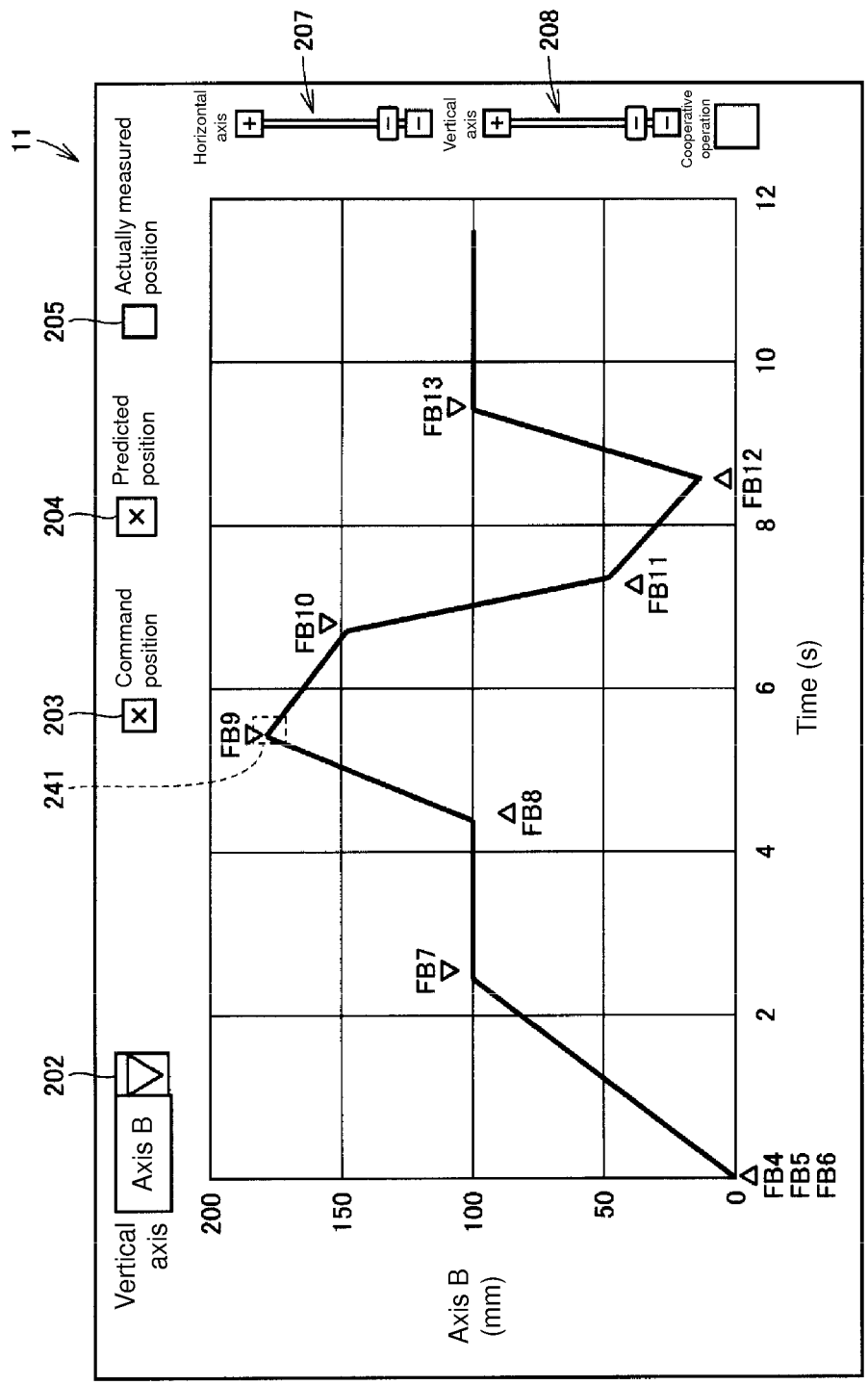
FIG. 19 is a view showing a state in which the trajectories of the command position and the predicted position are displayed on the screen with the horizontal axis as time and the vertical axis as the axis B.

FIG. 19 is a view showing a state in which the trajectories of the command position and the predicted position are displayed on the screen 11 with the horizontal axis as time and the vertical axis as the axis B. The PC 10 displays an error occurrence mark 241 in an area where the error is determined to be occurring in the axial direction displayed as the vertical axis. The user can easily confirm the error occurring area in a single axis with FIG. 19 compared to FIG. 15. When the user clicks the error occurrence mark 241, the PC 10 transitions the content to display on the screen 11 from the display content shown in FIG. 19 to the display content (enlarged display screen) shown in FIG. 16. When the user clicks the error occurrence mark 241, the PC 10 may perform the screen transition and display on the screen 11 an image in which one part of the graph of FIG. 19 is enlarged with the horizontal axis as the time and the vertical axis as the axis B.

The horizontal axis of FIG. 19 may be the displacement from the start of the operation (displacement from the coordinate P6 in the present embodiment) in place of the time. The vertical axis of FIG. 19 may be a velocity (velocity calculated from change in the command position or velocity calculated from change in the response position) in place of the position (command position or response position). In the present embodiment, direct transition can be made from the graph in which the horizontal axis is the time or the displacement and the vertical axis is the position or the velocity, where reference is often made in the designing of the motion program, to the enlarged display in which the portion of the trajectory where the error is occurring is enlarged.

Figure 20:
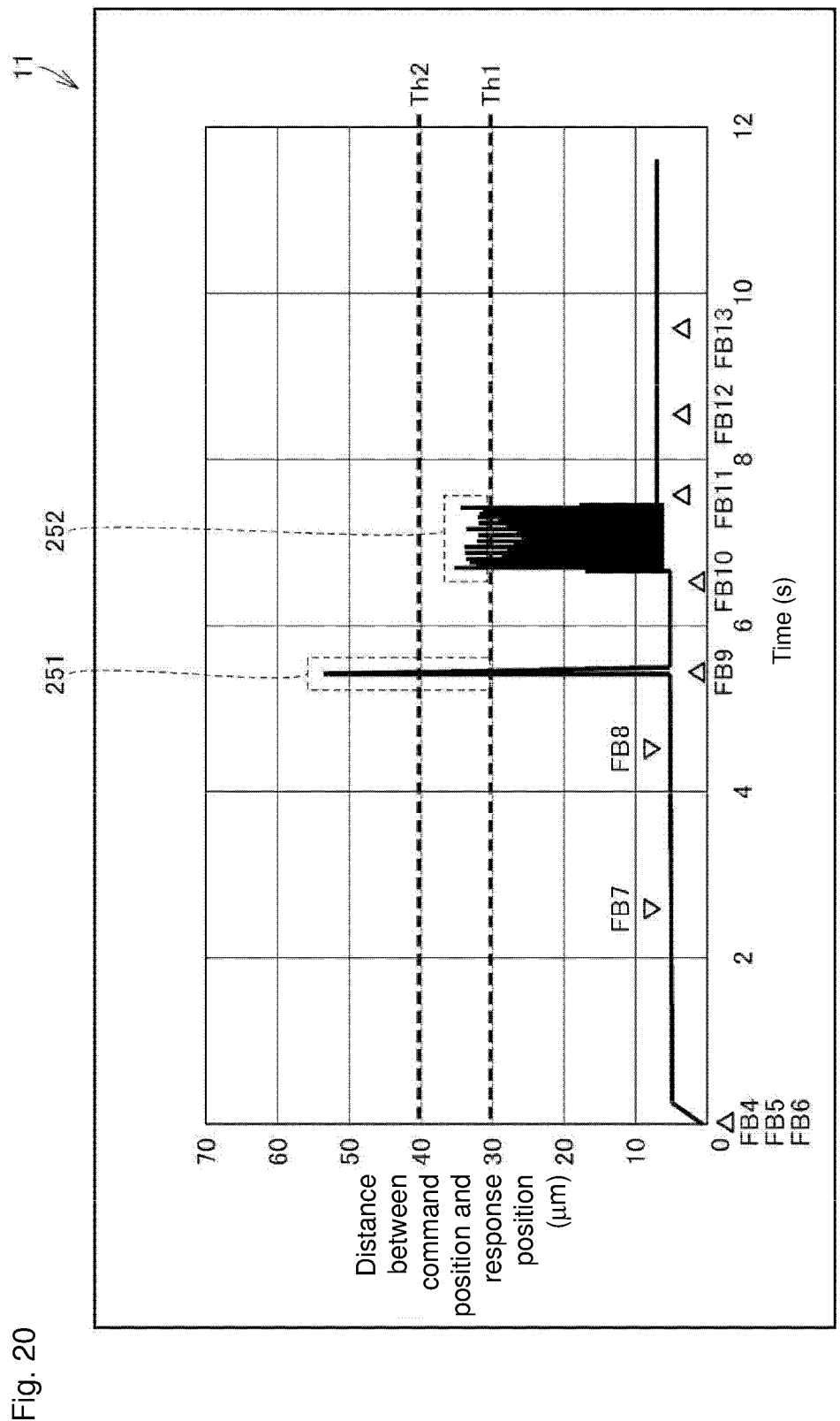
FIG. 20 is a view showing a state in which a graph having a horizontal axis as time and a vertical axis as error, that is, a distance between the command position and the response position at the same time is displayed on the screen.

FIG. 20 is a view showing a state in which a graph having a horizontal axis as time and a vertical axis as error, that is, a distance between the command position and the response position at the same time is displayed on the screen 11. The PC 10 may have the horizontal axis as the displacement. Th1 is a threshold value for determining that the error is occurring.

Assuming the display hue of the normal trajectory is a first hue, the PC 10 displays a portion of a trajectory (e.g., response positions 221, 223 in FIG. 16) where the error exceeds Th1 in FIG. 16 to FIG. 18 with a second hue. Th2 is a threshold value for determining that a greater error is occurring. The PC 10 displays a portion of a trajectory (e.g., response positions 222 in FIG. 16) where the error exceeds Th2 in FIG. 14 to FIG. 16 with a third hue. The PC 10 is configured such that the user can adjust the magnitude of each threshold value. In the present embodiment, the PC 10 can clearly display the size of the error by the trajectory itself of the response position.

In the present embodiment, the PC 10 calculates a distance between the command position and the response position at the same time as a distance within a three-dimensional space. However, not limited thereto, the PC 10 may select two axes and calculate the distance between the command value and the response position projected on a plane formed by each axis, or may select one axis and calculate the distance between the command value and the response position projected on the relevant axis.

According to the graph shown in FIG. 20, the user can confirm the amount of error and the time at which the error occurred. The user can use the confirmed error as reference information for appropriately tuning the command value and the servo parameter.

If error occurrence marks 251, 252 are also displayed on the screen 11 shown in FIG. 20 and the user clicks the error occurrence marks 251, 252, the PC 10 transitions the content to be displayed on the screen 11 to the display content (enlarged display screen) shown in FIG. 16. In other words, the PC 10 can show the shift in the size of the error on the axis of time or displacement by displaying the screen 11 shown in FIG. 20. The PC 10 can also directly transition from the screen showing the shift in the size of the error on the axis of time or displacement to the enlarged display screen of the portion of the trajectory where the error is occurring.

Figure 21:
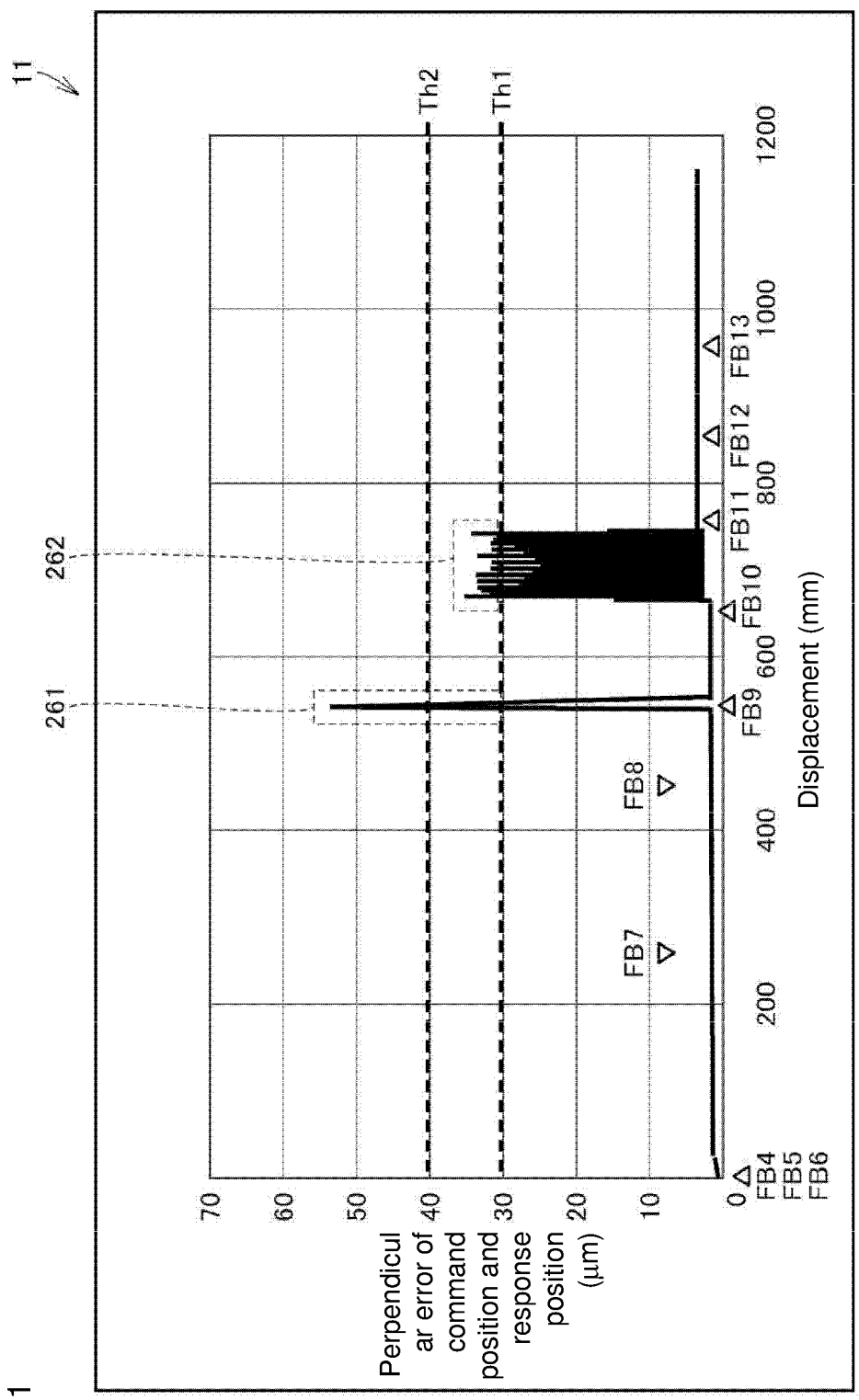
FIG. 21 is a view showing a state in which a horizontal axis as a displacement and a vertical axis as a perpendicular error between the command position and the response position are displayed on the screen.

FIG. 21 is a view showing a state in which a horizontal axis is a displacement and a vertical axis is a perpendicular error between the command position and the response position displayed on the screen 11. The horizontal axis may represent time. The perpendicular error is the distance from the spatial trajectory of the command position to the spatial trajectory of the response position along a direction perpendicular to the tangential direction of the three-dimensional or two-dimensional spatial trajectory of the command position.

The perpendicular error shows the magnitude of the spatial shift between the spatial trajectories excluding temporal advancement and delay element between the command position and the response position. Comparing the graph of FIG. 21 and the graph of FIG. 20, the direction of the error of the area where the error is greatly occurring is substantially perpendicular to the tangential direction of the spatial trajectory of the command position and thus there is barely any difference between the graphs, whereas the size of the error of the portion where the error is small is smaller than the size of the perpendicular error. This is believed to be because the error of FIG. 20 includes a component where the temporal delay such as delay in the change of the response position with respect to the change in the command position appears as an error of distance.

Therefore, the PC 10 can show the magnitude of the spatial shift between the spatial trajectories excluding the temporal advancement and delay elements between the command position and the response position. The PC 10 can directly transition from the screen showing the magnitude of the spatial shift to the screen displaying the portion of the trajectory where the error is occurring in an enlarged manner.

Error occurrence marks 261, 262 are also displayed in the screen 11 shown in FIG. 21, where the PC 10 can perform screen transition and display the display content shown in FIG. 16 on the screen 11 when the user clicks the error occurring marks 261, 262.

Figure 22:
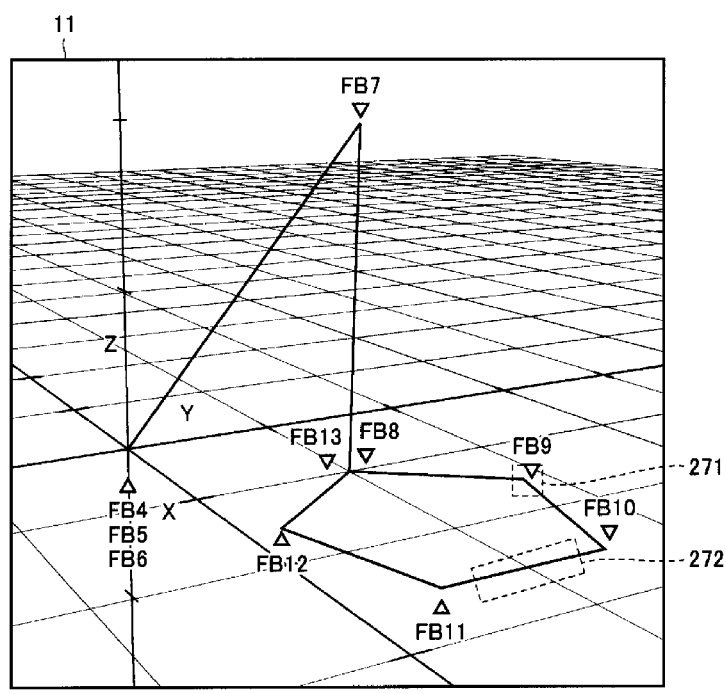
FIG. 22 is a view showing a state in which the trajectories of the command position and the response position in the three-dimensional space are displayed on the screen through a method of perspective view.

FIG. 22 is a view showing a state in which the trajectories of the command position and the response position in the three-dimensional space are displayed on the screen 11 through a method of perspective view. The PC 10 is configured such that the user can arbitrarily change the position of view point and the viewing direction for drawing the figure. The user can intuitively recognize the movement of three axes compared to the screen 11 shown in FIG. 15, which is a projection view on the plane of the trajectory.

The PC 10 displays error occurrence marks 271, 272 at the portion of the trajectory where the error is determined to be occurring. When the user clicks the error occurrence marks 271, 272, the PC 10 transitions the display content of the screen 11 from the display content shown in FIG. 22 to the display content shown in FIG. 16. Instead of transitioning to the display content shown in FIG. 16, the PC 10 may be configured to display in an enlarged manner the error occurring portion in the three-dimensional display. The PC 10 may also be configured to display the same time markers describe based on FIG. 17 in the three-dimensional display.

Figure 23:
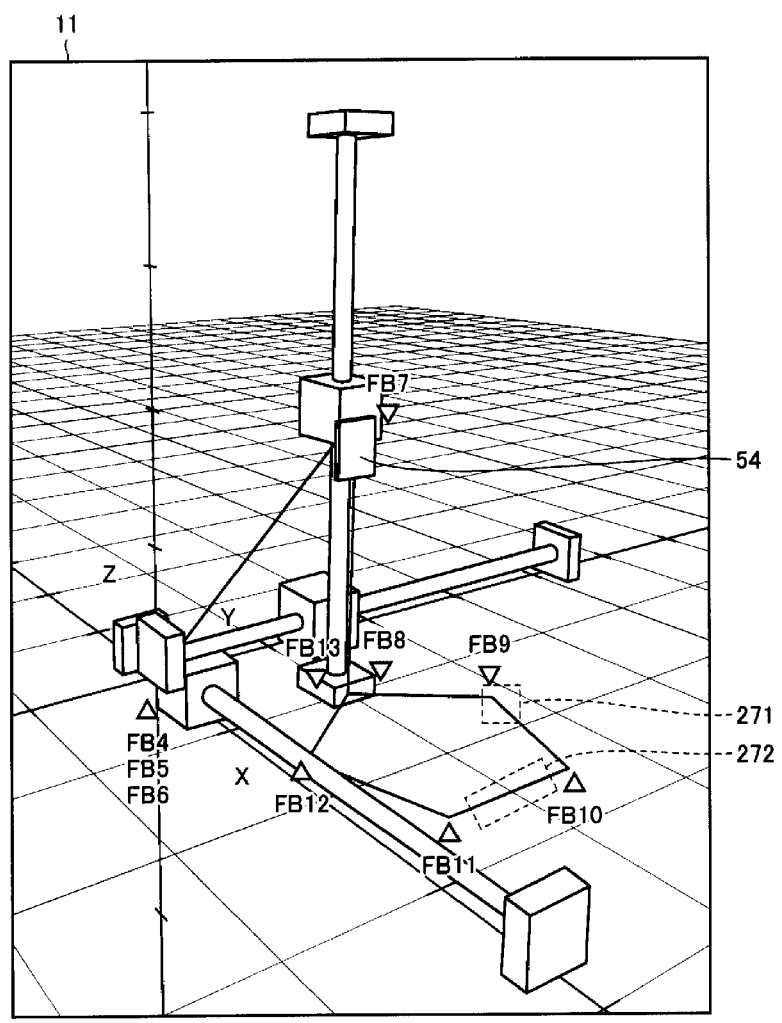
FIG. 23 is a view showing a screen when a virtual device model of an XYZ stage that operates in accordance with the command position or the response position is arranged in the three-dimensional space shown in FIG. 22.

FIG. 23 is a view showing the screen 11 when a virtual device model of an XYZ stage that operates in accordance with the command position or the response position is arranged in the three-dimensional space shown in FIG. 22. When the PC 10 carries out such display, the user can recognize the movement of the board cutting device 1A shown in FIG. 9 more realistically.

FIG. 24 is a view showing an example of a combination of the calculation process of the command position, the command value, the predicted position, and the actually measured value that may be adopted realistically for the main bodies and the like.

With reference to FIG. 24, in the first combination, the PC 10 calculates the command position and displays the calculated command position. The PC 10 calculates the predicted position and displays the calculated predicted position. The main body of such display (displaying main body) is the PC 10.

In the second combination, the PC 10 calculates the command position and displays the calculated command position. The PLC 20 calculates the command value for control. The PLC 20 transfers the actually measured value to the PC 10.

In the third combination, the PLC 20 calculates the command value for control. The PLC 20 transfers the command value to the PC 10. The PC 10 displays the command value. The PLC 20 transfers the actually measured value to the PC 10. The PC 10 displays the actually measured value.

In the fourth combination, the PC 10 calculates the command position and displays the calculated command position. The PLC 20 calculates the command value for control. The PC 10 calculates the predicted position and displays the calculated predicted position. The PLC 20 transfers the actually measured value to the PC 10. The PC 10 displays the actually measured value.

In the fifth combination, the PC 10 calculates the command position to calculate the predicted position. The PLC 20 calculates the command value for control. The PLC 20 transfers the command value to the PC 10. The PC 10 displays the command value. The PC 10 calculates the predicted position and displays the calculated predicted position. The PLC 20 transfers the actually measured value to the PC 10. The PC 10 displays the actually measured value.

As described above, the PC 10 of the control system 1 enables the error between the commanded command position of the specific portion of the control target corresponding to the command value and the predicted position theoretically predicted for the specific portion of the actual control target or the actually measured position measured for the relevant specific portion to be displayed so as to be easily understood by the user.

The embodiments disclosed herein are illustrative and should not be limited only by the contents described above. The scope of the invention is defined by the Claims, where meanings equivalent to the Claims and all modifications within the scope of the Claims are intended to be encompassed therein.

DESCRIPTION OF SYMBOLS 1 control system
1A board cutting device
10 PC
11 screen
20 PLC
21 power supply unit
22 CPU unit
23 I/O unit
24 MC unit
25 back plane
31, 32, 33 servo amplifier
41, 42, 43 servo motor
51a, 52a, 53a nut
54 cutter
60, 70 communication line
80 switch
90 board
101 sequence program
102 simulation unit
103 FB library
104 command value calculation unit
105 command position calculation unit
106 predicted position calculation unit
107 trace data storage unit
108 display data processing unit
109 display control unit
110 accepting unit
161 motor current calculating section
162 torque value calculating section
163 motor DB
164 motion equation calculating section
165 device DB
181 two-dimensional trajectory data generating section
182 three-dimensional trajectory data generating section
201, 202 pull-down menu
203, 204, 205 selection checkbox
206 field changing hand
207, 208 enlarge/reduce slide bar
209 cooperative-operation checkbox
211, 212 error occurrence mark
221, 222, 223 response position
231 response position marker
232 command position marker
233 rewind button
234 reverse play button
235 play button
236 fast-forward button
237 slide bar
241 error occurrence mark
251, 252 error occurrence mark
261, 262 error occurrence mark
271, 272 error occurrence mark
501, 502, 503 stage mechanism
907 monitor
908 driving device
1084 first display data creating section
1085 second display data creating section
1086 third display data creating section
1811 error calculating section
1812 determination section

The invention claimed is:

1. A display device for displaying a change in position of a specific portion of a control target on a screen as a trajectory, the control target being driven based on a series of command values output by execution of a motion program, the display device comprising a processor configured to execute a program to control the display device to operate as:

a first position acquiring unit configured to acquire a series of command positions, which are positions of the specific portion, based on the series of command values when mass and friction of the control target are ignored;

a second position acquiring unit configured to acquire a series of response positions corresponding to the series of command positions, the series of response positions being at least one of a series of positions of the specific portion based on the series of command values when a simulation taking into consideration at least one of the mass and the friction of the control target is performed and a series of positions of the specific portion measured when the control target has been driven based on the series of command values;

an error calculating section configured to calculate a difference in position of the command position and the response position corresponding to the command position;

a determination section configured to determine whether or not the calculated difference is greater than or equal to a predefined threshold value to indicate that an error has occurred;

a first display data creating section configured to create data for displaying on the screen at least one of a spatial trajectory formed by the series of command positions and a spatial trajectory formed by the series of response positions, and for displaying on the screen a first mark indicating the error has occurred in a portion of the spatial trajectory in which the calculated difference is greater than or equal to the predefined threshold value and configuring the first mark to surround the portion of the displayed spatial trajectory;

an accepting unit configured to accept a selecting operation of the first mark;

a second display data creating section configured to create data for displaying each spatial trajectory on the screen in a mode where a portion of a spatial trajectory of the command position corresponding to the selected first mark and a portion of a spatial trajectory of the response position corresponding to the portion of the spatial trajectory of the command position are enlarged at a same magnification, the mode being such that the enlarged portions of the spatial trajectories are overlapping each other; and a display control unit configured to display on the screen data created by the first display data creating section and data created by the second display data creating section;

wherein:

the second display data creating section is further configured to create data for displaying, on the screen, a second mark indicating the command position at a specified time and a third mark indicating the response position at the specified time; and the display control unit is further configured to:

display the second mark and the third mark when displaying the data created by the second display data creating section on the screen; and display positions of the second mark and the third mark which are changed according to the change of the specified time when the specified time is changed.

2. The display device according to claim 1, wherein:
the second display data creating section is configured to create the data so that a color of the enlarged spatial trajectory of the response position changes based on a magnitude of the calculated difference when creating data for displaying the spatial trajectory on the screen; and the display control unit is configured to display, on the screen, the enlarged spatial trajectory of the response position with the color based on the magnitude of the calculated difference when displaying data created by the second display data creating section on the screen.

3. The display device according to claim 1, wherein:
the second display data creating section is configured to create the data so that a display magnification of the spatial trajectory becomes respectively a specified display magnification in a first direction and a second direction orthogonal to the first direction in the screen when creating data for displaying the spatial trajectory on the screen; and the display control unit is configured to display, on the screen, the spatial trajectory enlarged at the specified display magnification in each of the first direction and the second direction.

4. The display device according to claim 1, further comprising a third display data creating section configured to create:

data for displaying a two-dimensional graph having a first axis as time or a displacement of the specific portion, and a second axis as the command position, a velocity of the specific portion calculated based on the command position, the response position, or a velocity of the specific portion calculated based on the response position; and data for displaying the portion in which the calculated difference is greater than or equal to a predefined threshold value on the two-dimensional graph, and the data for displaying a fourth mark, which is a target of the selecting operation accepted by the accepting unit, wherein:

the display control unit is configured to display the two-dimensional graph and the fourth mark on the screen; and the second display data creating section is configured to create data for displaying the trajectory in the enlarged mode for a portion corresponding to the selected fourth mark when the selecting operation of the fourth mark is accepted.

5. The display device according to claim 1, further comprising a third display data creating section configured to create:

data for displaying a two-dimensional graph having a first axis as time or a displacement of the specific portion, and a second axis as the magnitude of the calculated difference; and data for displaying a portion in which the calculated difference is greater than or equal to a predefined threshold value on the two-dimensional graph, the data displaying a fourth mark, which is a target of the selecting operation accepted by the accepting unit, wherein:

the display control unit is configured to display the two-dimensional graph and the fourth mark on the screen; and the second display data creating section is configured to create data for displaying the trajectory in the enlarged mode for a portion corresponding to the selected fourth mark when the selecting operation of the fourth mark is accepted.

6. The display device according to claim 1, further comprising a third display data creating section configured to create:

data for displaying a two-dimensional graph having a first axis as time or a displacement of the specific portion, and a second axis as a distance from a spatial trajectory of the command position to a spatial trajectory of the response position taken along a direction perpendicular to a tangential direction of the spatial trajectory of the command position; and data for displaying a portion in which the calculated difference is greater than or equal to a predefined threshold value on the two-dimensional graph, the data displaying a fourth mark, which is a target of the selecting operation accepted by the accepting unit, wherein:

the display control unit is configured to display the two-dimensional graph and the fourth mark on the screen; and the second display data creating section is configured to create data for displaying the trajectory in the enlarged mode for a portion corresponding to the selected fourth mark when the selecting operation of the fourth mark is accepted.

7. The display device according to claim 1, wherein the series of response positions corresponding to the series of command positions acquired by the second position acquiring unit is the series of positions of the specific portion based on the series of command values when a simulation taking into consideration at least one of the mass and the friction of the control target is performed.

8. A display control method for displaying a change in position of a specific portion of a control target on a screen of a display device as a trajectory, the control target being driven based on a series of command values output by execution of a motion program, the method comprising:

acquiring a series of command positions, which are positions of the specific portion, based on the series of command values when mass and friction of the control target are ignored by a processor of the display device;

acquiring a series of response positions corresponding to the series of command positions, the series of response positions being at least one of a series of positions of the specific portion based on the series of command values when a simulation taking into consideration at least one of mass and friction of the control target is performed by the processor and a series of positions of the specific portion measured when the control target device has been driven based on the series of command values;

calculating a difference in position of the command position and the response position corresponding to the command position by the processor;

determining whether or not the calculated difference is greater than or equal to a predefined threshold value to indicate that an error has occurred by the processor;

creating first data for displaying on the screen at least one of a spatial trajectory formed by the series of command positions and a spatial trajectory formed by the series of response positions, and for displaying on the screen a mark indicating the error has occurred in a portion of the spatial trajectory in which the calculated difference is greater than or equal to the predefined threshold value by the processor and configuring the first mark to surround the portion of displayed spatial trajectory;

accepting selecting operation of the mark by the processor;

creating second data for displaying each spatial trajectory on the screen in a mode where a portion of a spatial trajectory of the command position corresponding to the selected first mark and a portion of a spatial trajectory of the response position corresponding to the portion of the spatial trajectory of the command position are enlarged at a same magnification, the mode being such that the enlarged portions of the spatial trajectories are overlapping each other;

displaying the first data and the second data on the screen by the processor;

creating data for displaying on the screen a second mark indicating the command position at a specified time and a third mark indicating the response position at the specified time; and displaying:

the second mark and the third mark when displaying the second data; and positions of the second mark and the third mark which are changed according to the change of the specified time when the specified time is changed.

9. The display control method according to claim 8, wherein acquiring the series of response positions includes acquiring a series of response positions corresponding to the series of command positions, which is the series of positions of the specific portion based on the series of command values when a simulation taking into consideration at least one of the mass and the friction of the control target is performed.

10. A non-transitory computer readable recording medium storing a program for displaying a change in position of a specific portion in a control target on a screen of a display device as a trajectory, the control device being driven based on a series of command values output by execution of a motion program, the program causing the display device to:

acquire a series of command positions, which are positions of the specific portion, based on the series of command values when mass and friction of the control target are ignored;

acquire a series of response positions corresponding to the series of command positions, the series of response positions being at least one of a series of positions of the specific portion based on the series of command values when a simulation taking into consideration at least one of mass and friction of the control target is performed and a series of positions of the specific portion measured when the drive is performed based on the series of command values;

calculate a difference in position of the command position and the response position corresponding to the command position;

determine whether or not the calculated difference is greater than or equal to a threshold value defined in advance to indicate an error has occurred;

create first data for displaying on the screen at least one of a spatial trajectory formed by the series of command positions and a spatial trajectory formed by the series of response positions, and for displaying on the screen a mark indicating the error has occurred in a portion of the spatial trajectory in which the calculated difference is greater than or equal to the threshold value and configuring the first mark to surround the portion of the displayed spatial trajectory;

accept selecting operation of the mark;

create second data for displaying each spatial trajectory on the screen in a mode where a portion of a spatial trajectory of the command position corresponding to the selected first mark and a portion of a spatial trajectory of the response position corresponding to the portion of the spatial trajectory of the command position are enlarged at a same magnification, the mode being such that the enlarged portions of the spatial trajectories are overlapping each other;

display the first data and the second data on the screen;

create data for displaying on the screen a second mark indicating the command position at a specified time and a third mark indicating the response position at the specified time; and display:

the second mark and the third mark when displaying the second data; and positions of the second mark and the third mark which are changed according to the change of the specified time when the specified time is changed.

11. The non-transitory computer readable recording medium according to claim 10, wherein the series of response positions are acquired by acquiring a series of response positions corresponding to the series of command positions, which is the series of positions of the specific portion based on the series of command values when a simulation taking into consideration at least one of the mass and the friction of the control target is performed.

* * * * *